(12) United States Patent
Lesi et al.

(10) Patent No.: US 12,455,590 B2
(45) Date of Patent: Oct. 28, 2025

(54) CLOCK MANAGER REDUNDANCY FOR TIME SYNCHRONIZED NETWORKS

(71) Applicant: Intel Corporation, Santa Clara, CA (US)

(72) Inventors: Vuk Lesi, Cornelius, OR (US); Christopher Gutierrez, Hillsboro, OR (US); Shabbir Ahmed, Beaverton, OR (US); Marcio Juliato, Portland, OR (US); Manoj Sastry, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 175 days.

(21) Appl. No.: 17/974,113

(22) Filed: Oct. 26, 2022

(65) Prior Publication Data

US 2024/0143020 A1 May 2, 2024

(51) Int. Cl.
*G06F 1/12* (2006.01)
*G06F 1/08* (2006.01)
*G06F 1/10* (2006.01)

(52) U.S. Cl.
CPC .................. *G06F 1/12* (2013.01); *G06F 1/10* (2013.01); *G06F 1/08* (2013.01)

(58) Field of Classification Search
CPC .................. G06F 1/08; G06F 1/10; G06F 1/12
See application file for complete search history.

(56) References Cited

U.S. PATENT DOCUMENTS

| 8,694,939 | B1 * | 4/2014 | Frost | G06F 30/34 |
| | | | | 716/136 |
| 9,094,392 | B1 * | 7/2015 | Hwang | H04K 3/90 |
| 9,112,630 | B1 | 8/2015 | Mizrahi | |
| 9,973,601 | B2 * | 5/2018 | Spada | H04J 3/0641 |
| 11,327,525 | B1 * | 5/2022 | Salluzzo | G06F 1/08 |
| 11,849,016 | B1 * | 12/2023 | Wang | H04L 43/0858 |
| 2013/0227008 | A1 | 8/2013 | Yang | |
| 2013/0227172 | A1 * | 8/2013 | Zheng | H04J 3/0667 |
| | | | | 709/248 |

(Continued)

FOREIGN PATENT DOCUMENTS

CN 114301561 A * 4/2022
WO WO-2022088106 A1 * 5/2022 .......... H04W 12/086

*Primary Examiner* — Jaweed A Abbaszadeh
*Assistant Examiner* — Cheri L Harrington
(74) *Attorney, Agent, or Firm* — KDW FIRM PLLC

(57) ABSTRACT

An apparatus for clock manager redundancy comprises a clock circuitry to manage a clock for a device; a first processing circuitry coupled to the clock circuitry to execute instructions to perform operations for a clock manager, the clock manager to receive messages with time information for a network and generate clock manager control information to adjust the clock to a network time for the network; a hardened execution environment coupled to the clock circuitry and the first processing circuitry, the hardened execution environment to comprise: a detector to monitor the clock manager and generate an alert when the detector identifies abnormal behavior of the clock manager; and a second processing circuitry to execute instructions to perform operations for a redundant clock manager, the redundant clock manager to take over operations for the clock manager in response to the alert from the detector. Other embodiments are described and claimed.

20 Claims, 21 Drawing Sheets

(56) References Cited

U.S. PATENT DOCUMENTS

| | | | |
|---|---|---|---|
| 2015/0378389 A1* | 12/2015 | Kulkarni | G06F 1/04 |
| | | | 713/400 |
| 2017/0093677 A1* | 3/2017 | Skerry | H04L 43/20 |
| 2020/0252424 A1* | 8/2020 | Regev | H04J 3/0667 |
| 2021/0181787 A1 | 6/2021 | Chan | |
| 2021/0211461 A1* | 7/2021 | Beardsley | H04J 3/0688 |
| 2023/0229188 A1* | 7/2023 | Shapira | G06F 1/10 |
| | | | 713/500 |
| 2024/0356687 A1 | 10/2024 | Speicher | |

* cited by examiner

CLOCK MANAGER REDUNDANCY FOR TIME SYNCHRONIZED NETWORKS

This application relates to previously filed U.S. patent application Ser. No. 17/829,042 filed May 31, 2022, entitled "CLOCK MANAGER MONITORING FOR TIME SYNCHRONIZED NETWORKS", which is hereby incorporated by reference in its entirety.

BACKGROUND

Many computing systems require real-time safety critical features. For example, many autonomous systems, industrial systems, etc., require such systems to have real-time safety-critical features. This often necessitates that timekeeping performance within the system has higher levels of security relative to other aspects of the system. For example, factories employ synchronized robots to accomplish coordinated tasks, often in the presence of human beings. In another example, robots utilize coordination to perform surgeries on humans. As yet another example, self-driving vehicles require synchronization of networked sensing elements to build a precise perception of the environment around the vehicle, including other vehicles, objects, hazards, and persons. Tools relied on to achieve the necessary time performance, synchronization, and bounded latency communication for such time sensitive systems to perform as needed is often referred to as time-sensitive networking (TSN).

In general, TSN defines a set of standards (and amendments) with the aim to enable time synchronization and deterministic data delivery in converged networks where time-critical (TC) traffic coexists with other types of traffic. Thus, there is a need to provide security for TSN devices to mitigate the risks associated with disruption in TSN operation from attacks on the timing of the network.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1A:
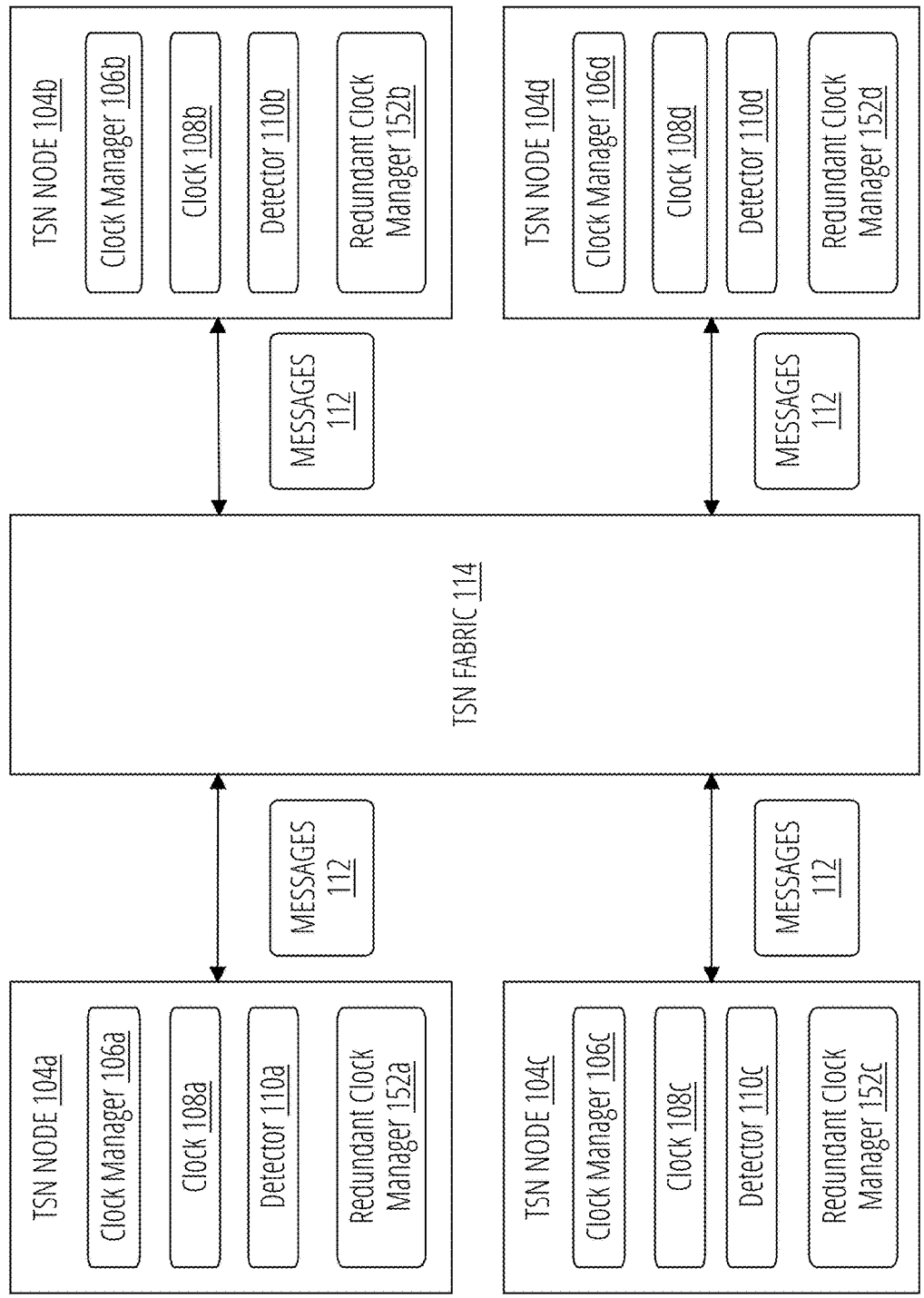
FIG. 1A illustrates an aspect of a time sensitive network (TSN) 102 in accordance with one embodiment.

In the following description, numerous specific details are set forth in order to provide a thorough understanding of various embodiments. However, various embodiments may be practiced without the specific details. In other instances, well-known methods, procedures, components, and circuits have not been described in detail so as not to obscure the particular embodiments. Further, various aspects of embodiments may be performed using various means, such as integrated semiconductor circuits ("hardware"), computer-readable instructions organized into one or more programs ("software"), or some combination of hardware and software. For the purposes of this disclosure reference to "logic" shall mean either hardware (such as logic circuitry or more generally circuitry or circuit), software, firmware, or some combination thereof.

The present disclosure is generally directed to time management and recovery techniques for systems operating on strict time requirements, such as systems based on time sensitive networks (TSNs). As noted, TSN defines a set of standards (and amendments) with the aim to enable time synchronization and deterministic data delivery in converged networks where time sensitive traffic coexists with other types of traffic. Various standards have been developed to address time-sensitive communications. Three of the more prominent standards for enabling time-sensitive communications are promulgated by the Institute of Electrical and Electronics Engineers (IEEE). For example, IEEE 1588, IEEE 802.1AS and IEEE 802.1Qbv provide systems and methods for synchronizing device clocks. In particular, IEEE 1588 provides a protocol for time synchronization across a network; IEEE 802.1AS provides a protocol for time synchronization across a TSN, where time sensitive devices (e.g., clock followers) synchronize to a leader clock (e.g., clock leader); and IEEE 802.1Qbv provides for prioritizing time sensitive traffic in the network switches using gate-controlled lists (GCLs).

Time synchronization in a TSN requires tight software-hardware interplay. A device (or node) in a TSN may implement a clock manager as a software component and a hardware clock as a hardware component. The clock manager adjusts timing for the hardware clock to ensure synchronization with a common network time for the TSN. In one embodiment, for example, a precision time protocol (PTP) hardware clock (PHC) is periodically adjusted by a PTP for Linux (PTP4L) software module to account for time offset between a clock leader and a clock follower in PTP-synchronized nodes. A corrupted software component can misconfigure or mis-control hardware, however, leading to incorrect timekeeping. Attackers located within a TSN-capable platform can tamper with the operation of the clock manager software, such as by tampering with offset sensing, clock adjustment computation, or frequency adjustment actuation. Consequently, system and applications depending on TSN capabilities will consume incorrect time. The incorrect timekeeping may further influence any applications using the time synchronization resource. Accordingly, early detection of a corrupted software component, such as a clock manager for a TSN node, is critical in a TSN.

To solve these and other problems, embodiments implement various clock manager monitoring techniques to assess whether clock hardware (e.g., a PHC) is correctly controlled by clock manager software (e.g., a PTP4L clock manager) in order to promptly flag anomalies. The clock manager monitoring techniques are based on a heterogenous and redundant analytical physics-aware model, of the clock manager. These techniques are physics-aware since a standard Linux implementation of a PTP4L clock manager is based on a proportional-integral (PI) controller. These techniques are analytical (i.e., equation based) in order to cover advancements in clock manager technology, such as the design and implementation of advanced PTP servos by the Time Appliances Project. The clock manager monitoring techniques result in execution of a lightweight, verifiable model at runtime to detect deviations. This consumes less compute cycles and memory resources, while enabling earlier detection of compromised clock platforms in a TSN node.

In general, embodiments implement a detector to monitor a clock manager to identify any abnormal behavior. The detector monitors time information received by the clock manager as input, and monitors control information sent from the clock manager as output to a hardware clock. The detector compares the clock manager control information to model control information derived from a clock manager model to find difference information (e.g., a residual). The detector compares the difference information to a defined threshold and generates an alert or takes a security action based on results of the comparison.

A clock manager model and/or model control information can be predicted, derived or estimated utilizing a number of different techniques. In general, a clock manager model attempts to accurately model, synthesize, quantify or otherwise baseline normal behavior for a clock manager when adjusting timing for a hardware clock. The baseline normal behavior can then be used as a basis for detecting abnormal behavior of a clock manager, thereby providing indications of an attack or compromised clock manager. For instance, statistical techniques may be used to simulate operations for a clock manager. Statistical techniques, however, may not have sufficient accuracy for some security applications. Since TSN is used to control the clock synchronization process similarly to physical systems, such as autonomous systems to control a vehicle or industrial systems to control robotic arms, physics-based techniques can be used to model physics-based controllers (e.g., the clock servo, comprising the clock manager). Consequently, a clock manager model implemented for a detector can change based on a given type of TSN network and/or security application. For instance, to have a time synchronization protocol-aware relay to form a network compliant with IEEE 802.1Qbv, relay nodes should perform packet-switching on a microsecond-level. Accordingly, embodiments attempt to customize a detector and clock manager model for a given type of TSN network and/or security application to provide optimal results.

In some embodiments, a clock manager model for a detector is based on an analytical (equation-based) model of a clock manager implemented in software. This can be obtained by analyzing a clock manager implementation (e.g, code) and/or by performing system identification based on input-output data. The detector clock manager model is securely executed alongside the monitored clock manager and provides predictions or estimates of the clock adjustments that should be made to the hardware clock. These predictions are compared with the actual output of the clock manager, enabling runtime assessment of whether the clock manager software is controlling the hardware clock as expected. When the detector suspects the clock manager software is corrupted, it generates an alarm signal that can be sent to an intrusion detection system (IDS) for a TSN node, a cluster of TSN nodes or a TSN.

Additionally, or as an alternative to, issuing an alarm signal to the IDS, the detector can generate a clock switch signal to switch clock management operations from the clock manager to a redundant clock manager. A redundant clock manager can be implemented on the same device as the clock manager (e.g., co-located) or on a separate device from the clock manager. The redundant clock manager remains in a "hot" standby mode and is ready to take over clock management operations from the clock manager immediately upon activation or connection to the clock circuitry for the clock.

Once the detector suspects the clock manager software is corrupted or compromised, it generates a clock switch signal that can be sent to switch logic that controls a hardware switch within a TSN node. Given the tight time constraints typically associated with a TSN node or TSN application, the TSN node will typically implement a hardware switch for faster performance. In some cases, however, a TSN node could implement a software switch depending on a set of performance parameters for a given TSN node. Embodiments are not limited in this context.

A hardware switch is configured to switch between at least two hardware (e.g., electrical or circuit) connection paths. The first connection path is between the clock manager and the clock. The second connection path is between the redundant clock manager and the clock. In normal operations, the switch is configured to complete a connection for the first connection path. When the clock manager is compromised, however, the switch logic receives a clock switch signal from the detector. The switch logic sends a signal to the hardware switch to disconnect the connection for the first connection path and complete a connection for the second connection path. Once switched, the clock will stop receiving clock management signals from the compromised clock manager along the first connection path and start receiving clock management signals from the redundant clock manager along the second connection path. In this manner, the redundant clock manager can quickly and seamlessly operate as a redundant or backup time synchronization resource to support all devices, systems and applications that depend on TSN capabilities to ensure such devices, systems and applications consume a correct time.

In one embodiment, for example, the redundant clock manager can implement a clock servo model that uses a same or similar analytical clock manager model (or clock servo model) as used by the detector to detect abnormal behavior of the clock manager. As previously discussed, the detector already includes a clock manager model that is securely executed alongside the monitored clock manager and provides predictions or estimates of the clock adjustments that should be made to the hardware clock in realtime. These predictions are compared with the actual output of the clock manager, enabling runtime assessment of whether the clock manager software is controlling the hardware clock as expected. Consequently, the clock manager model has all current and up-to-date timing and state information for the clock manager, the TSN node and/or the TSN network. Further, the clock manager model provides predictions or estimates that are sufficiently precise, and continuously refined, to note deviations from normal clock management information sent to the clock. Accordingly, the clock manager model can be used to quickly take over and maintain timing for the device (or TSN node) until the clock manager is repaired or a new clock manager is instantiated for the device.

In one embodiment, for example, an apparatus to implement clock redundancy can be part of a device in a network that includes a clock circuitry to implement a hardware clock for the device. The device may comprise, for example, a TSN node in a TSN, such as a clock leader, a clock follower, a relay node, a switch node, and so forth. The clock circuitry may be implemented, for example, as a TSN-enabled hardware clock such as a PHC. The apparatus may comprise a first processing circuitry coupled to the clock circuitry, the first processing circuitry to execute instructions to perform operations for a clock manager. The clock manager may manage timing operations for the clock circuitry. The clock servo, comprising the clock manager, may be implemented, for example, as a physics-based clock servo, such as the PI clock servo comprising the PTP4L clock manager. The clock manager may receive messages with time information for a network and generate clock manager control information to adjust the clock to a network time for the network, such as the TSN.

The apparatus may also include a hardened execution environment coupled to the clock circuitry and the first processing circuitry. The hardened execution environment may be hardware-based or software-based with suitable hardware features and/or support. In various embodiments, the hardened execution environment may be implemented, for example, as a trusted platform module (TPM), a trusted computing base (TCB), a trusted execution environment (TEE), hypervisor-based environments, virtual machine environments, software guard extensions (SGX) made by Intel® Corporation, an Intel trusted execution technology (TXT), an Intel technology enabling platform (TEP), or other secure execution environment. A secure execution environment is a system of hardware, software and firmware to execute secure and trusted processes and store confidential information. The hardened execution environment may comprise, among other components, a detector to monitor operations of the clock manager (e.g., the inputs and/or outputs) to detect abnormal behavior indicative of a corrupted or compromised software component. For instance, the detector is operative to receive or intercept the clock manager control information, generate model control information based on a clock manager model, compare the clock manager control information with the model control information to generate difference information, and determine whether to generate an alert based on the difference information. The hardened execution environment may also comprise a second processing circuitry to execute instructions to perform operations for a redundant clock manager. The redundant clock manager is ready to take over operations for the clock manager in response to an alert from the detector. The redundant clock manager can use a clock servo model that is the same or similar to the clock servo model used by the detector. Other clock servo models different from the clock servo model used by the detector may also be implemented for the redundant clock manager as well. Embodiments are not limited in this context.

FIG. 1A depicts a time sensitive network (TSN) 102 implemented according to a TSN standard (e.g., IEEE 1588, IEEE 802.1AS, IEEE 802.1Qbv, IEEE 802.15.4, or the like). As depicted, TSN 102 includes various TSN nodes 104, such as TSN nodes 104*a-d*. The TSN nodes 104 may be implemented as different types of nodes for a TSN, such as an origination node, relay nodes, switch nodes or end node. The TSN nodes 104*a-d* are communicatively coupled via a TSN fabric 114. The TSN fabric 114 can connect the TSN nodes 104*a-d* using various types of network topology (e.g., mesh, star, etc.) and various types of communications channels (e.g., wired, wireless, fiber optic, buses, etc.). It is noted that the number of nodes in the TSN 102 is selected for purposes of clarity and not limitation. In practice, the TSN 102 can include any number and combination of nodes (e.g., origination nodes, switches, relay nodes, end devices, etc.).

The TSN nodes 104 can communicate with each other via the TSN fabric 114. For instance, the TSN nodes 104 can send messages 112 to each other over one or more communication channels provided by the TSN fabric 114. The messages 112 can include control information and payload information. One type of control information may include time information. The time information may comprise synchronization messages, time update messages or time follow-up messages (among other time protocol messages) for a time protocol used by the TSN 102.

Each TSN node 104 in the TSN 102 includes various hardware, software and/or firmware components. As depicted in FIG. 1A, a TSN 104 includes a clock manager 106, a clock 108, a detector 110 and a redundant clock manager 152. For instance, the TSN node 104*a* includes a clock manager 106*a*, a clock 108*a*, a detector 110*a*, and a redundant clock manager 152*a*. The TSN node 104*b* includes a clock manager 106*b*, a clock 108*b*, a detector 110*b* and a redundant clock manager 152*b*. The TSN nodes 104*c*, 104*d* are similarly configured. It may be appreciated that these are just a few components for a TSN 104, and the TSN 104 can include other standard components for an electronic device, such as network interfaces, radio transceivers, input/output (I/O) components, memory units, processing circuits, controllers, sensors, actuators, mechanical parts, application software, operating system software, TSN-enabled platforms, and so forth.

In various embodiments, the clock manager 106 is implemented as a software component, and the clock 108 is implemented as a hardware component (e.g., "hardware clock" or "clock circuitry"). The detector 110 can be implemented as a software component, a hardware component, or a combination of both software and hardware components. Similarly, the redundant clock manager 152 can be implemented as a software component, a hardware component, or a combination of both software and hardware components.

The clock manager 106 and the redundant clock manager 152 should be implemented in separate execution environments isolated from each other. For instance, the clock manager 106 and the clock manager 152 can be implemented by different processing circuitries, processors, logic circuits, chips, dies, systems on a chip (SoC), apparatus, devices, systems, and so forth. In one embodiment, the redundant clock manager 152 is implemented in a hardened execution environment such as secure TPM or TCB. In this manner, a security attack on the clock manager 106 will not affect the redundant clock manager 152. Embodiments are not limited in this context.

The clock manager 106 generally manages a time (e.g., clock signals) generated by the clock 108. A key component in clock synchronization mechanisms is the clock manager software. In a time sensitive network such as the TSN 102, this component tightly interacts with network hardware (e.g., Ethernet/Wi-Fi) to obtain Precision Time Protocol (PTP) message timestamps, as well as with PTP clock hardware to implement suitable phase/frequency corrections in order to synchronize with a clock leader. The clock manager 106 typically implements a "clock servo." A clock servo is a control algorithm that periodically takes as input some measurement (or estimate) of clock offset to a reference clock, and computes as output either time (e.g., phase) or frequency adjustment to compensate for the given offset.

The clock 108 is generally a hardware clock that implements clock circuitry to generate signals for digital electronics implemented by the TSN node 104. In electronics and especially synchronous digital circuits, a clock signal oscillates between a high and a low state and is used to coordinate actions of the digital circuits. A clock signal is produced by a clock generator. Although more complex arrangements are used, the most common clock signal is in the form of a square wave with a 50% duty cycle, usually with a fixed, constant frequency. Circuits using the clock signal for synchronization may become active at either the rising edge, falling edge, or, in the case of double data rate, both in the rising and in the falling edges of the clock cycle. The clock 108 generates clock signals under control of the clock manager 106. The clock 108 can be implemented using any suitable hardware having a timing accuracy required by a given device or network. In the TSN 102, the clock 108 can be implemented as a PHC, although other hardware clocks can be implemented as well. Embodiments are not limited in this context.

In normal operation, a network interface (not shown) for a TSN node 104 can receive messages 112 that include time information representative of a network time for the TSN 102. The clock manager 106 can receive the time information from the network interface, analyze the time information, and determine whether time adjustments are needed for the clock 108. When time adjustments are needed, the clock manager 106 generates control information and sends the control information to the clock 108. The clock 108 receives the clock manager control information, and adjusts a parameter for the clock 108, such as a phase or frequency for the clock signals generated by the clock 108.

The detector 110 generally monitors the clock manager 106 to detect abnormal or malicious behavior of the clock manager 106. More particularly, the detector monitors the inputs and outputs of the clock manager 106, e.g., control information sent to the clock 108. In the case of a TSN node 104 implementing a Linux operating system, for example, the clock servo is integral to an implementation of the PTP4L clock management module. When the clock manager 106 is implemented as PTP4L, for example, the clock servo is a proportional integral (PI) controller. The operation of this controller can be compromised by adversaries targeting Linux kernel exploits, or, for example, vulnerabilities in the PTP protocol implementation itself (i.e., PTP4L executable). In return, this gives attackers indirect access to cause system and application malfunction through malicious timekeeping.

However, if the clock synchronization process is described using physical models, the detector 110 can implement a clock servo model based on the physical models as a form of analytical redundancy, such as an equation-based copy of the system. The clock servo model is a physics-based analytical model that simulates a clock servo used by the clock manager. The detector 110 can efficiently and securely execute the physical models at runtime in parallel to the actual system and serve as basis for anomaly/attack detection. While some embodiments instantiate a modeling approach based on the example of PTP4L, it may be appreciated that the framework is not limited to PI-based clock servos. Embodiments are not limited in this context.

The redundant clock manager 152 generally provides an alternate time source that remains on ready stand-by in case the clock manager 106 is subject to a security attack and compromised. In one embodiment, the redundant clock manager 152 can implement the same or similar clock management software as used by the clock manager 106. For instance, when a TSN node 104 implements the clock manager 106 as a PTP4L, the clock servo is a proportional integral (PI) controller. In this case, the redundant clock manager 152 may implement similar functions to PTP4L.

In another embodiment, the redundant clock manager 152 can implement a different clock management software as used by the clock manager 106. The clock servo may be any physics-based controller capable of synchronizing time similar to the PI controller comprising the clock manager 106. Since the redundant clock manager 152 may be a different implementation, it may not be susceptible to the same compromises by adversaries targeting Linux kernel pr PTP4L exploits against the clock manager 106. As a further security precaution to protect against such exploits, the redundant clock manager 152 is implemented in a hardened execution environment that is separate and isolated from an execution environment used to execute the clock manager 106. In this way, a security attack on the clock manager 106 will not affect operations for the redundant clock manager 152.

In general, the redundant clock manager 152 should maintain a same operational state as the clock manager 106 in order to be ready to take over clock timing operations for a TSN node. In one embodiment, for example, the redundant clock manager 152 can directly consume the same time measurements as the clock manager 106 during normal operations. This implementation means that access to the time information must be outside a reach for an attacker, hence, the clock circuitry would be considered secure itself. This could be implemented via direct taps into the communications bus or channels between the network interface and the clock manager 106.

In another embodiment, for example, the redundant clock manager 152 can indirectly consume the same time measurements as the clock manager 106 via the detector 110. In this implementation, the detector 110 and the redundant clock manager 152 can be communicatively coupled. Since the detector 110 safely consumes the time information received from the TSN network, by using direct taps into the communications bus or channels between the network interface and the clock manager 106, the time information can be securely forwarded from the detector 110 to the redundant clock manager 152 on a periodic, aperiodic or on-demand basis.

Additionally or alternatively, the redundant clock manager 152 can synchronize configuration information with the detector 110. For instance, the redundant clock manager 152 may also implement a same or similar clock synchronization process as the detector 110, which utilizes a clock synchronization process that is described using physical models. In this way, the detector 110 can implement the physical models as a form of analytical redundancy, such as an equation-based copy of the system. The detector 110 can efficiently and securely execute the physical models at runtime in parallel to the actual system and serve as a basis for anomaly/attack detection. Similarly, the redundant clock manager 152 may also implement the same equation-based copy of the system used by the detector 110. The redundant clock manager 152 can efficiently and securely execute the physical models at runtime in parallel to the actual system and serve as a basis for producing time information for time redundancy in the event of a security event, as described in more detail below. The redundant clock manager and the detector can exchange configuration information, such as state information, to synchronize the clock servo model of the redundant clock manager with the clock servo model of the detector. It is worthy to note that while some embodiments instantiate a modeling approach based on the example of PTP4L, it may be appreciated that the framework is not limited to PI-based clock servos. Embodiments are not limited in this context.

Figure 1B:
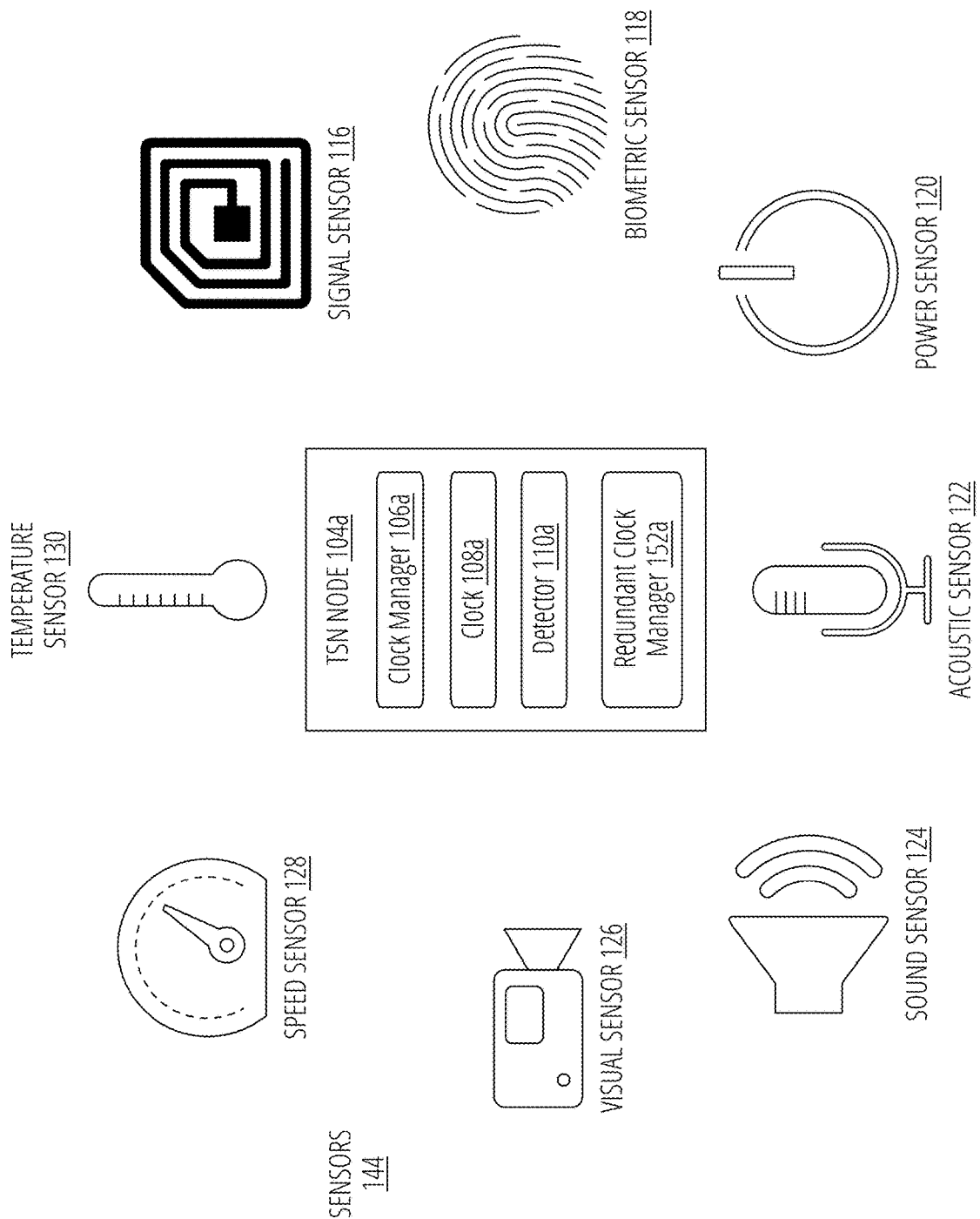
FIG. 1B illustrates an aspect of a TSN 102 for sensors in accordance with one embodiment.

FIG. 1B illustrates an example of a TSN node 104a of the TSN 102 designed to control one or more sensors 144. As depicted in FIG. 1B, the TSN node 104 manages various types of sensors 144, such as a signal sensor 116, a biometric sensor 118, a power sensor 120, an acoustic sensor 122, a sound sensor 124, a visual sensor 126, a speed sensor 128, a temperature sensor 130, and so forth. The TSN node 104a may be suitable for implementing a physics-based model for the detector 110. A physics-based approach as proposed herein utilizes state prediction based on physical models of system dynamics. Unlike conventional information-based security measures, the physics-based model may utilize physical properties of a system, along with controller state estimation, to enable computationally-inexpensive analytical redundancy. For example, a mathematical model-based replica of the system is simultaneously executed to detect attacks.

Figure 1C:
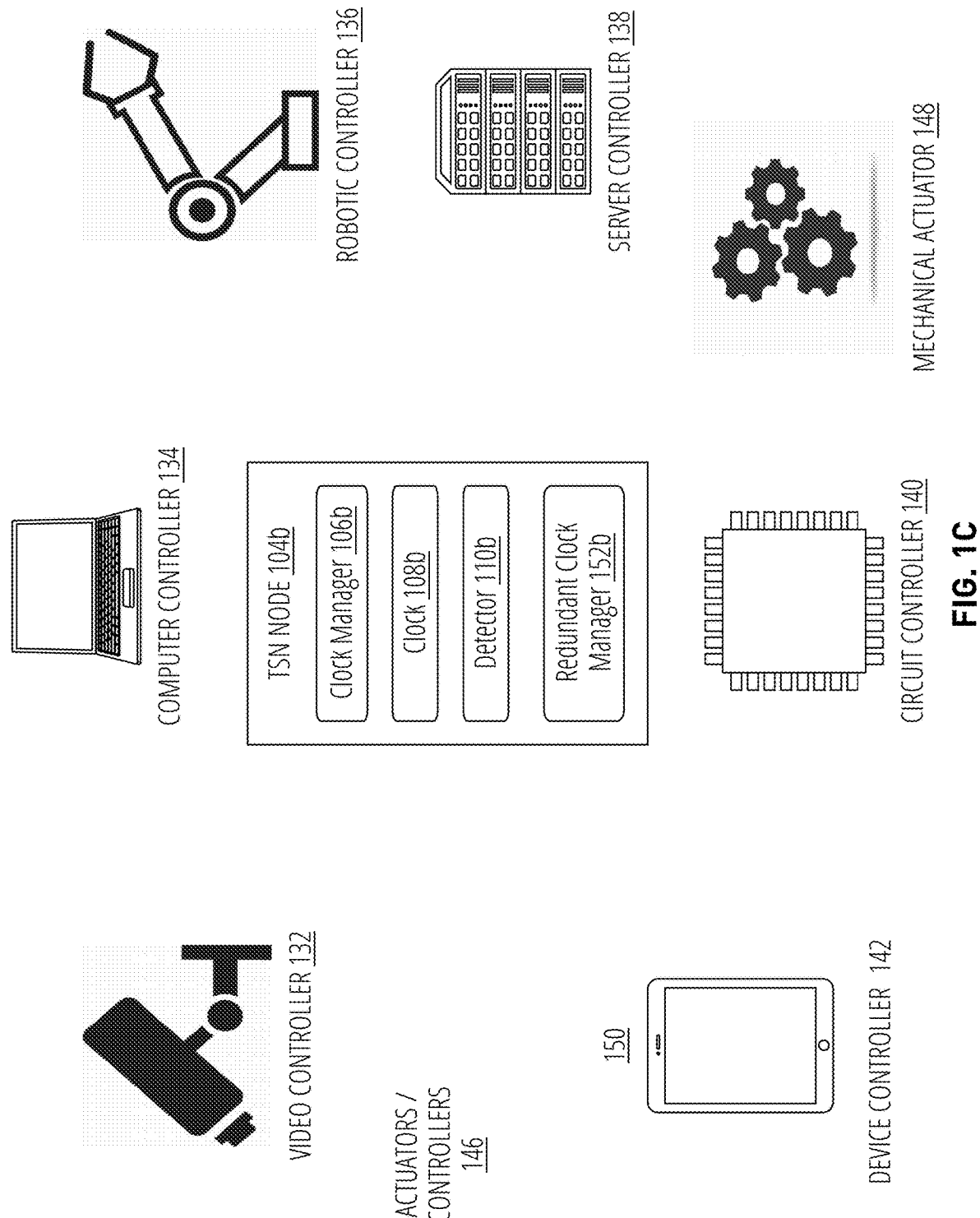
FIG. 1C illustrates an aspect of a TSN 102 for actuators in accordance with one embodiment.

FIG. 1C illustrates an example of a TSN node 104b of the TSN 102 designed to control one or more actuators and/or host controllers 146. As depicted in FIG. 1C, the TSN node 104b manages various types of actuators/controllers 146, such as a robotic controller 136, a server controller 138, a mechanical actuator 148, a circuit controller 140, a device controller 142, a video controller 132, a computer controller 134, and so forth. As with FIG. 1B, the TSN node 104b shown in FIG. 1C may be suitable for implementing a physics-based model for the detector 110, as discussed in more detail herein.

In time sensitive networks, such as the TSN 102 depicted in FIGS. 1A-1C, it becomes important for all the TSN nodes 104 to synchronize to a common or shared network time for the TSN 102. For instance, the TSN nodes 104 may operate in accordance with IEEE 802.1AS which implements a hierarchical network to synchronize one or more clock followers (CFs) to a clock leader (CL) through relays or switch nodes. Synchronization is performed through communication of time messages, such as the messages 112. The time messages may comprise, for example, time synchronization messages, time update messages and/or time follow-up messages for a PTP.

In some cases, an attacker may simply attempt to disrupt timing of a single TSN node 104 handling critical functions, such as disrupting one or both of the TSN node 104a managing the sensors 144 and/or the TSN node 104b managing the actuators/controllers 146. Rather than attempting to disrupt timing for the entire TSN 102, the attacker may attempt to attack timing of a single TSN node 104 to disrupt key operations for the TSN node 104, such as an electronic control unit (ECU) to control speed sensing for a vehicle or a controller for a robotic arm in a factory.

In other cases, an attacker may attempt to disrupt timing across the entire TSN 102. To attack or disrupt the TSN 102, an attacker may attempt a timing attack or desynchronization attack to compromise timing for one or more of the TSN nodes 104 in the TSN 102. Assume the TSN node 104c operates as a clock leader (CL) in the TSN 102, and the TSN node 104d operates as a clock follower (CF) in the TSN 102. If an attacker located on a network device (e.g., switch or relay) modifies a critical attribute on a specific port, then all downstream nodes from that network device will suffer a desynchronization event. In this example, if the attacker successfully compromises the TSN node 104c, then the TSN node 104d is vulnerable to a timing attack in the form of receiving messages 112 from the TSN node 104c with erroneous time information. Therefore, it becomes important to detect and localize an attack as quickly as possible. Furthermore, upon detection, it becomes important for the TSN 102 to quickly isolate the compromised network device and thereby prevent the desynchronization attack from spreading to other downstream nodes.

In all cases, a time sensitive network such as the TSN 102 is vulnerable to a timing attack or a desynchronization attack. If a single network node is compromised, it may cause a cascade failure across the entire TSN 102. An example of such an attack is further described with reference to FIGS. 2A, 2B, 3A and 3B.

Figure 2A:
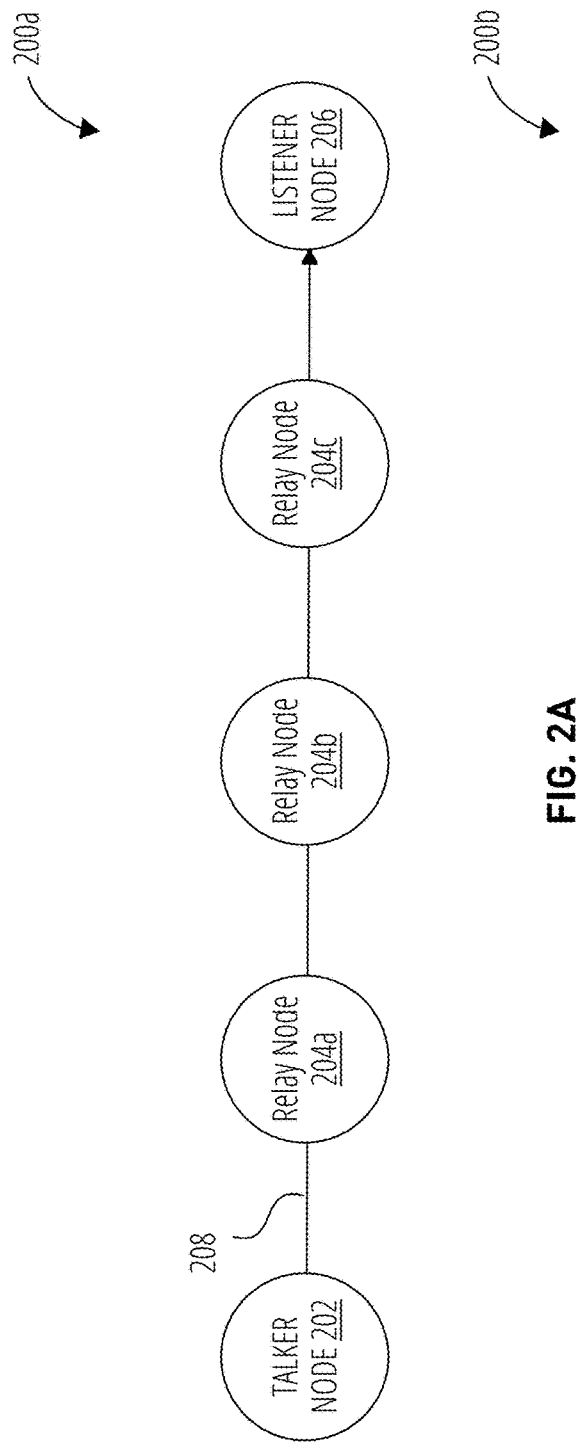
FIG. 2A illustrates an aspect of a TSN 200a in accordance with one embodiment.

FIG. 2A depicts a TSN 200a implemented according to a TSN standard (e.g., IEEE 1588, IEEE 802.1AS, IEEE 802.1Qbv, or the like). As depicted, the TSN 200a includes talker node 202, relay nodes 204a, 204b, and 204c, and listener node 206, all communicatively coupled via communication channel 208. It is noted that the number of nodes in the TSN 200a is selected for purposes of clarity and not limitation. In practice, the TSN 200a can include any number and combination of nodes (e.g., origination nodes, talker nodes, listener nodes, switches, relay nodes, end devices, etc.). Nodes in the TSN 200a (e.g., talker node 202, listener node 206, relay node 104a, relay node 104b, and relay node 104c, etc.) are provided in a GCL table, which specifies timing for windows in which the nodes can transmit packets on communication channel 208. It is also noted that the terms "switch node" and "relay node" are used interchangeably. For instance, the IEEE 802.AS defines protocol-aware switches as relays.

Relay nodes 204a, 204b, and 204c are time-aware switching nodes and can be any number of devices in a network arranged to communicate information. A talker node 202 sends or originates information and a listener node 206 receives or consumes information. Examples of a talker node 202 or a listener node 206 include devices such as electronic control units in an autonomous vehicle, an industrial system, a medical system, or the like. Additionally, communication channel 208 can be any of a variety of communication channels, including wired or wireless communication channels. In some implementations, all devices in the TSN 200a will receive GCL tables. However, in some implementations, only talker nodes 202 and switching nodes (e.g., relay node 204a, etc.) receive GCL tables while destination devices (e.g., listener node 206) do not receive a GCL table.

Figure 2B:
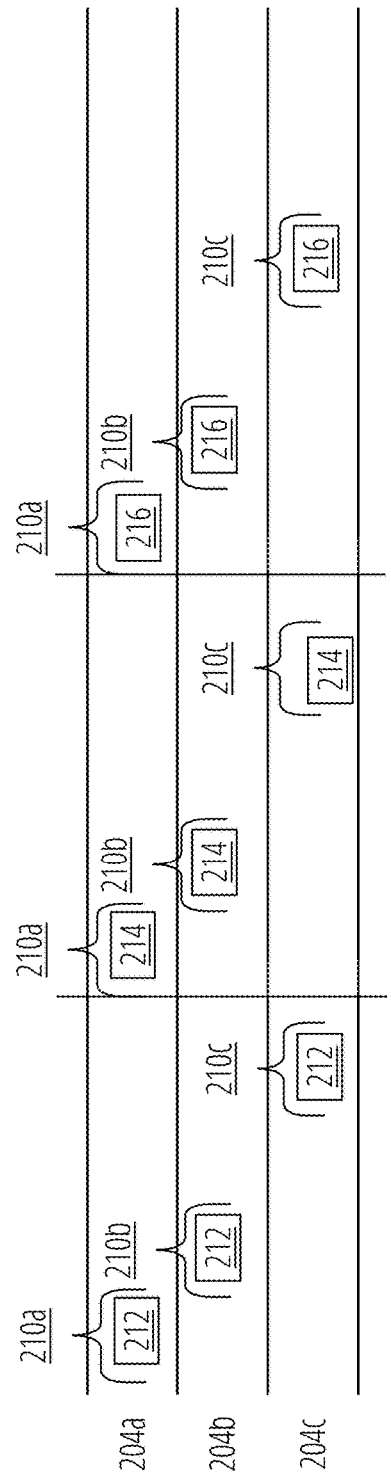
FIG. 2B illustrates an aspect of a timing diagram 200b in accordance with one embodiment.

FIG. 2B depicts a timing diagram 200b depicting communication windows (e.g., Qbv windows, or the like) for switches of TSN 200a based on GCL tables. Typically, GCL tables are generated in a network controller (not shown) and are designed to prioritize time critical (TC) traffic and prevent lower priority traffic from accessing communication channel 208, thus guaranteeing the timely delivery of TC packets within pre-configured time windows. In particular, timing diagram 200b depicts Qbv windows 210a, 210b, and 210c in which packets 212, 214, and 216 are transmitted. It is noted that the communication windows referred to herein are referred to as Qbv windows or protected windows for clarity. However, other standard or techniques for forming protected communication windows to facilitate time synchronization can be used besides Qbv windows. Examples are not limited in this context.

To facilitate transmission of packets (e.g., packet 212, etc.) during protected windows (e.g., Qbv window 210a, etc.), nodes in the TSN 200a are time synchronized and scheduled to transmit TC packets (e.g., packet 212, etc.) using non overlapping protected windows (e.g., Qbv window 210a, etc.). It is to be appreciated that providing latency bounded communication (e.g., as depicted in timing diagram 200b) requires tight synchronization of time between nodes in TSN 200a. With such dependency on time synchronization, reliable TSN operation can be disrupted by attacking the timing of the network, sometimes referred to as a desynchronization attack or event.

Figure 3A:
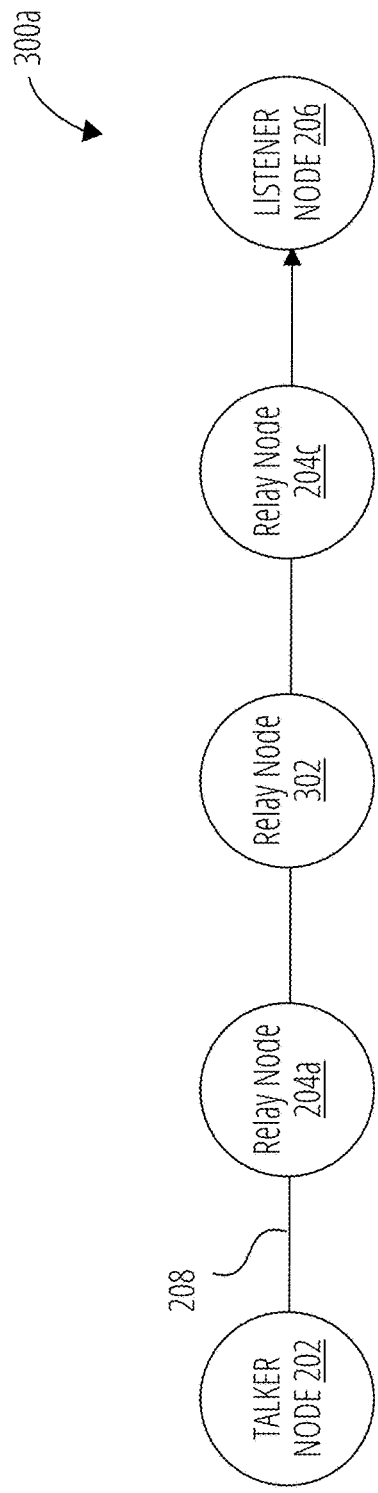
FIG. 3A illustrates an aspect of a TSN 300a in accordance with one embodiment.

FIG. 3A depicts a TSN 300a, which is like TSN 200a except that the relay node 302 is depicted as compromised. In particular, the clock (not shown) of relay node 302 can be attacked and compromised, thereby causing the Qbv window 210b associated with relay node 302 to be misaligned with respect to, and even overlap with, the protected windows of the other switch nodes in the data stream path (e.g., along communication channel 208).

Figure 3B:
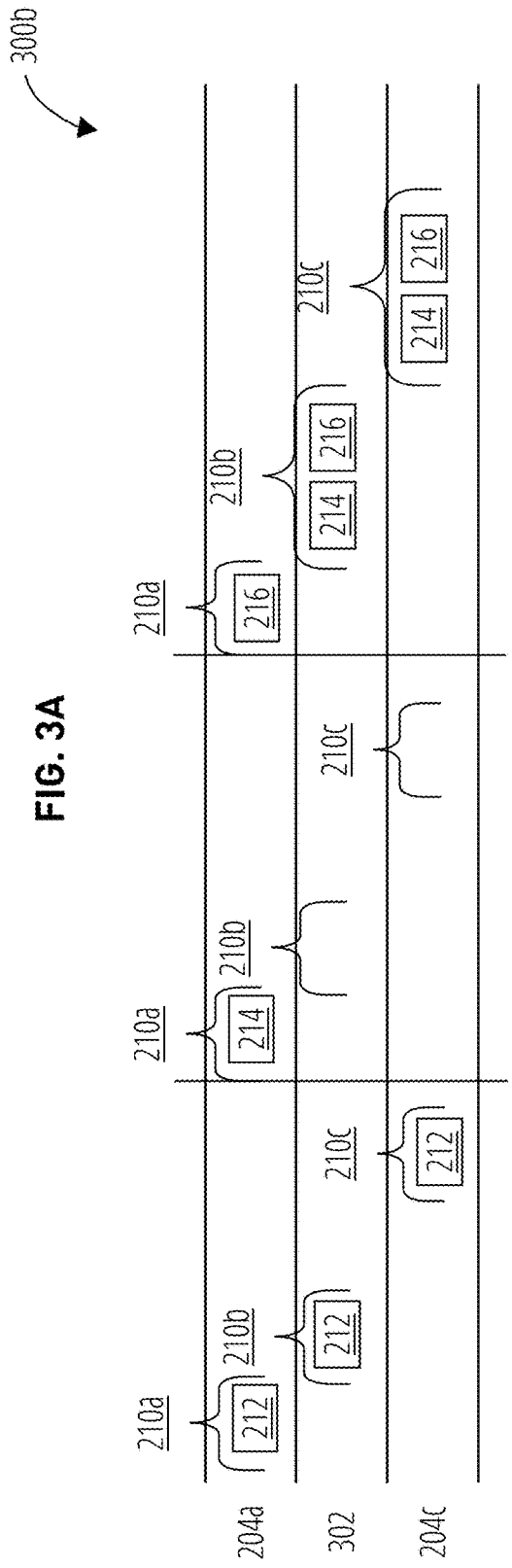
FIG. 3B illustrates an aspect of a timing diagram 300b in accordance with one embodiment.
Figure 4:
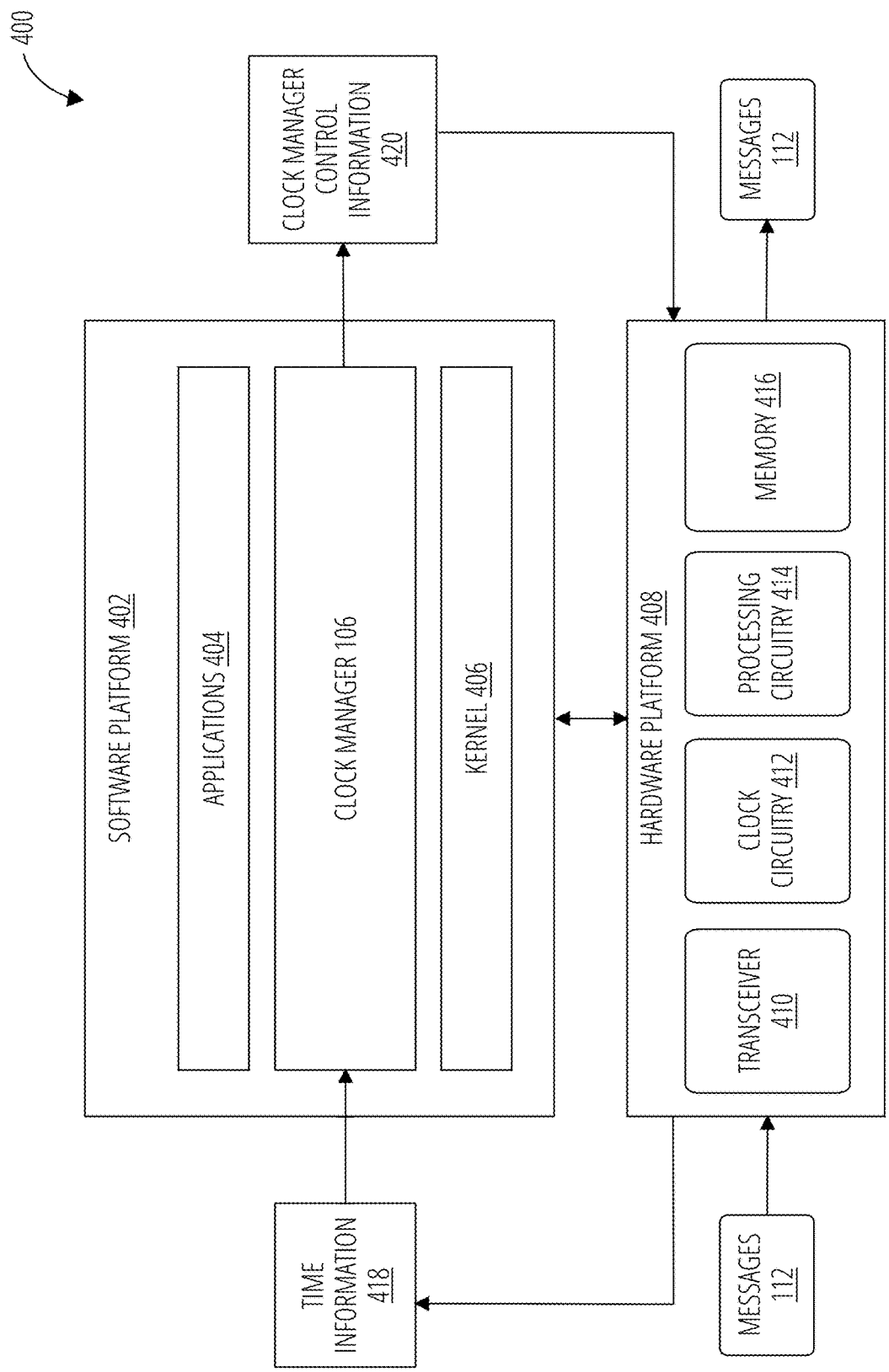
FIG. 4 illustrates an aspect of a TSN node 104 in accordance with one embodiment.

FIG. 3B depicts timing diagram 300b illustrating Qbv window 210b misaligned with Qbv window 210a and Qbv window 210c and overlapping with Qbv window 210a. As such, packets (e.g., packet 214 in the figure) arrive too late with respect to the attacked switch protected window (e.g., Qbv window 210b) causing them to be buffered and sent in the next protected window. As a result of the delay in transmitting packet 214, relay node 302 breaks the latency bound of the stream that it is serving and can result in errors or comprise the safety of the system in which the nodes are operating FIG. 4 illustrates an apparatus 400. The apparatus 400 is a more detailed view of part of a TSN node 104 that implements one or more TSN protocols or standards. The TSN node 104 may be implemented as any network devices suitable for operation within a TSN, such as TSN 102, 200a, 300a, and so forth. The TSN node 104 may be implemented as part of a vehicle, robot, industrial machine or any other devices suitable for a TSN. The TSN node 104 may be implemented as an origination node 202, relay nodes 204a-204c, relay node 302 and/or end node 206. The TSN node 104 may be implemented as either a clock leader (CL) or a clock follower (CF) in a TSN. The TSN node 104 may include interfaces to communicate information with other TSN nodes 104 in the TSN 102, such as messages 112, for example.

The TSN node 104 may operate in accordance with a timing protocol, such as a precision time protocol (PTP) for IEEE 1588, IEEE 802.1AS, IEEE 802.15.4, and so forth. For instance, the TSN node 104 may operate in accordance with IEEE 802.1AS which implements a hierarchical network to synchronize clock followers (CFs) to a clock leader (CL) through relays or switch nodes. Synchronization is performed through communication of time messages, such as the messages 112. The time messages may comprise, for example, time synchronization messages, time update messages or time follow-up messages (among others) for a PTP. The time messages may include, among other fields and attributes, a correction field, which accumulates a network residence, and an origin timestamp for a CL. The time message may also comprise, for example, a packet delay message type with additional fields and attributes.

As depicted in FIG. 4, the apparatus 400 may include a software platform 402 and a hardware platform 408. The software platform 402 may include, among other software components, one or more applications 404, a clock manager 106, and a kernel 406. The hardware platform 408 may include, among other hardware components, a network interface such as a transceiver 410, clock circuitry 412, processing circuitry 414 and memory 416. Note the apparatus 400 as depicted in FIG. 4 is shown without the detector 110 or the redundant clock manager 152. An example of a TSN node 104 with the detector 110 will be discussed with reference to FIG. 6. An example of a TSN node 104 with the detector 110 and the redundant clock manager 152 will be discussed with reference to FIG. 8A.

The processing circuitry 414 may include circuitry or processor logic, such as, for example, any of a variety of commercial processors. In some examples, the processing circuitry 414 may include multiple processors, a multi-threaded processor, a multi-core processor (whether the multiple cores coexist on the same or separate dies), and/or a multi-processor architecture of some other variety by which multiple physically separate processors are in some way linked. Additionally, in some examples, the processing circuitry 414 may include graphics processing portions and may include dedicated memory, multiple-threaded processing and/or some other parallel processing capability. In some examples, the processing circuitry 414 may be an application specific integrated circuit (ASIC) or a field programmable integrated circuit (FPGA). In some examples, the processing circuitry 414 may be circuitry arranged to perform computations related to TSN, such as switching, clock leader, clock follower, routing, security, and so forth.

The memory 416 may include logic, a portion of which includes arrays of integrated circuits, forming non-volatile memory to persistently store data or a combination of non-volatile memory and volatile memory. It is to be appreciated, that the memory 416 may be based on any of a variety of technologies. In particular, the arrays of integrated circuits included in memory 406 may be arranged to form one or more types of memory, such as, for example, dynamic random access memory (DRAM), NAND memory, NOR memory, or the like.

The transceiver 410 may include logic and/or features to support a communication interface. For example, the transceiver 410 may include one or more interfaces that operate according to various communication protocols or standards to communicate over direct or network communication links. Direct communications may occur via use of communication protocols or standards described in one or more industry standards (including progenies and variants). For example, the transceiver 410 may facilitate communication over a bus, such as, for example, peripheral component interconnect express (PCIe), non-volatile memory express (NVMe), universal serial bus (USB), system management bus (SMBus), SAS (e.g., serial attached small computer system interface (SCSI)) interfaces, serial AT attachment (SATA) interfaces, or the like. In some examples, transceiver 410 may be arranged to support wireless communication protocols or standards, such as, for example, Wi-Fi, Bluetooth, ZigBee, LTE, 5G, or the like.

The TSN node 104 may also include where the network is a controller area network (CAN) or a vehicle area network (VAN). The TSN node 104 may be implemented as a device that manages a sensor, actuator or a controller. The sensors may comprise a speed sensor, a direction sensor, a global positioning system (GPS) sensor, a gas pedal sensor, a brake pedal sensor, a positioning sensor, an object detection sensor, a lane detection sensor, a radar sensor, a light detection and ranging (LIDAR) sensor, an ultrasound sensor, an inertial measurement unit (IMU) sensor, a temperature sensor, a pressure sensor, an altitude sensor, an acoustic sensor, and so forth.

In one aspect, the TSN node 104 may be implemented as a CL or CF for the TSN 102. As previously discussed, the clock manager 106 may ensure that the clock circuitry 412 maintains a network time for the TSN 102. When operating in a CL role, the clock manager 106 may send a message 112 with time information 418 representing a current network time to one or more nodes operating in a CF role for the TSN 102. When operating in a CF role, the clock manager 106 may receive a message 112 from a CL node. The clock manager 106 may use the time information 418 from the message 112 to synchronize a local device time with the current network time maintained by the clock circuitry 412. The clock manager 106 analyzes the time information 418, and determines whether to adjust a parameter (e.g., phase or frequency) of the clock circuitry 412 to synchronize the clock circuitry 412 to the current network time.

Figure 5A:
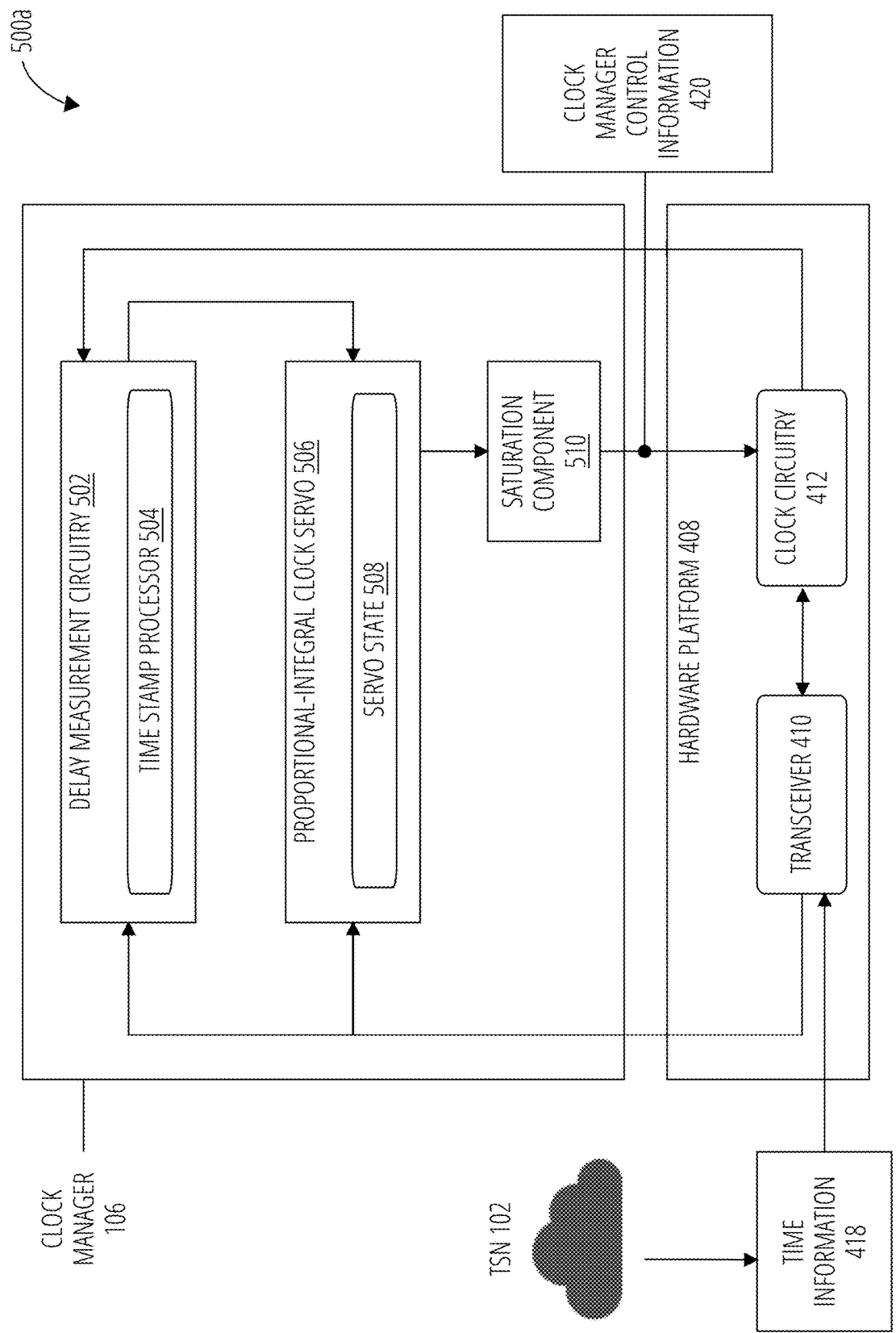
FIG. 5A illustrates an aspect of an apparatus 500a in accordance with one embodiment.

FIG. 5A illustrates a more detailed view for a clock manager 106 suitable to implement various aspects of the embodiments. As previously discussed, the clock manager 106 is a key component in clock synchronization mechanisms. The clock manager 106 tightly interacts with the transceiver 410 to obtain PTP message timestamps from the time information 418 received via messages 112 from a CL node in the TSN 102. The clock manager 106 then outputs clock manager control information 420 to the hardware platform 408. The clock manager control information 420 may represent suitable phase/frequency corrections in order to synchronize the clock circuitry 412 with a network time maintained by the CL.

As depicted in FIG. 5A, the clock manager 106 is an example of a PTP4L implementation that includes delay measurement circuitry 502 with a time stamp processor 504. The clock manager 106 further includes a proportional-integral clock servo 506 that maintains a servo state 508. The clock manager 106 also includes a saturation component 510.

The proportional-integral clock servo 506 is generally a control algorithm that periodically takes as input some measurement (or estimate) of clock offset to a reference clock, and computes as output either time (e.g., phase) or frequency adjustment to compensate for the given offset. When the kernel 406 is implemented as a Linux operating system, for example, the clock manager 106 and the proportional-integral clock servo 506 can be implemented as a PTP4L clock management module. However, embodiments are not limited to this example.

The delay measurement circuitry 502 and/or the proportional-integral clock servo 506 periodically takes as input a correction feature from a correction field in the time information 418 contained within messages 112 received by the transceiver 410.

The delay measurement circuitry 502 receives as input raw time measurements (e.g., path or link delay (pdelay) or sync/follow-up message talker origin/listener ingress timestamps) from the time information 418 and performs filtering operations to reduce measurement noise from the raw time measurements. This is because using raw or unfiltered measurements may adversely impact decisions made by the proportional-integral clock servo 506. In one embodiment, filtering is implemented as a sliding window average, where a default window length is set as 10 seconds or 80 samples for a default synchronization/follow-up period.

Filtered pdelay measurements of the time stamp processor 504 may be used to compute time offsets from a CL clock, such as clock circuitry 412 for a TSN node 104 that operates in a CF role for the TSN 102. In some cases, however, the time stamp processor 504 may alternatively give raw pdelay measurements where the filtering component is disabled. Additionally, the delay measurement circuitry 502 can compute a rate ratio, or ratio of CL clock and CF clock frequencies, based on synchronization/follow-up message timestamps (e.g., t1, t2, t3, . . . , tn).

The proportional-integral clock servo 506 may receive the filtered pdelay measurements, rate ratio, and time offset as inputs, and use the inputs to compute clock manager control information 420 for the clock circuitry 412. The clock manager control information 420 may comprise, for example, a phase or frequency adjustment for the clock circuitry 412.

Before the proportional-integral clock servo 506 sends the clock manager control information 420 to the clock circuitry 412, the proportional-integral clock servo 506 outputs the clock manager control information 420 to the saturation component 510. The saturation component 510 performs final adjustments to clock manager control information 420, such as ensuring the clock manager control information 420 does not adjust a frequency parameter for the clock circuitry 412 too quickly or beyond a maximum frequency. The saturation component 510 then outputs the clock manager control information 420 to the hardware platform 408.

Despite the many advantages of implementing a clock manager 106 as a PTP4L proportional-integral controller, this implementation presents security concerns. For instance, the operation of this type of controller can be compromised by adversaries targeting Linux kernel exploits, or vulnerabilities in the PTP4L implementation itself. In return, this gives attackers indirect access to cause system and application malfunction through malicious timekeeping. The attacker may influence the clock circuitry 412 by gaining execution privileges in the software domain (e.g., ring 0 and above) and altering behavior of the PTP4L software components of the clock manager 106. This may ultimately cause clock circuitry 412 misbehavior.

The attack can impact a TSN node 104 in many ways. Some examples are as follows. A first attack vector can be through sensing, where the attacker attempts to modify timing values that contribute to pdelay and offset computation before they are consumed by the proportional-integral clock servo 506. Another attack vector can be through control, where the attacker attempts to modify the control code computing actuation (e.g., frequency adjustment) based on sensing (e.g., offset). A third attack vector could be through actuation, where the attacker attempts to modify frequency adjustment values computed by the proportional-integral clock servo 506 and sent to the clock circuitry 412 for implementation. Examples of security vulnerabilities for the clock manager 106 are further described with reference to FIGS. 5B-5D.

Figure 5B:
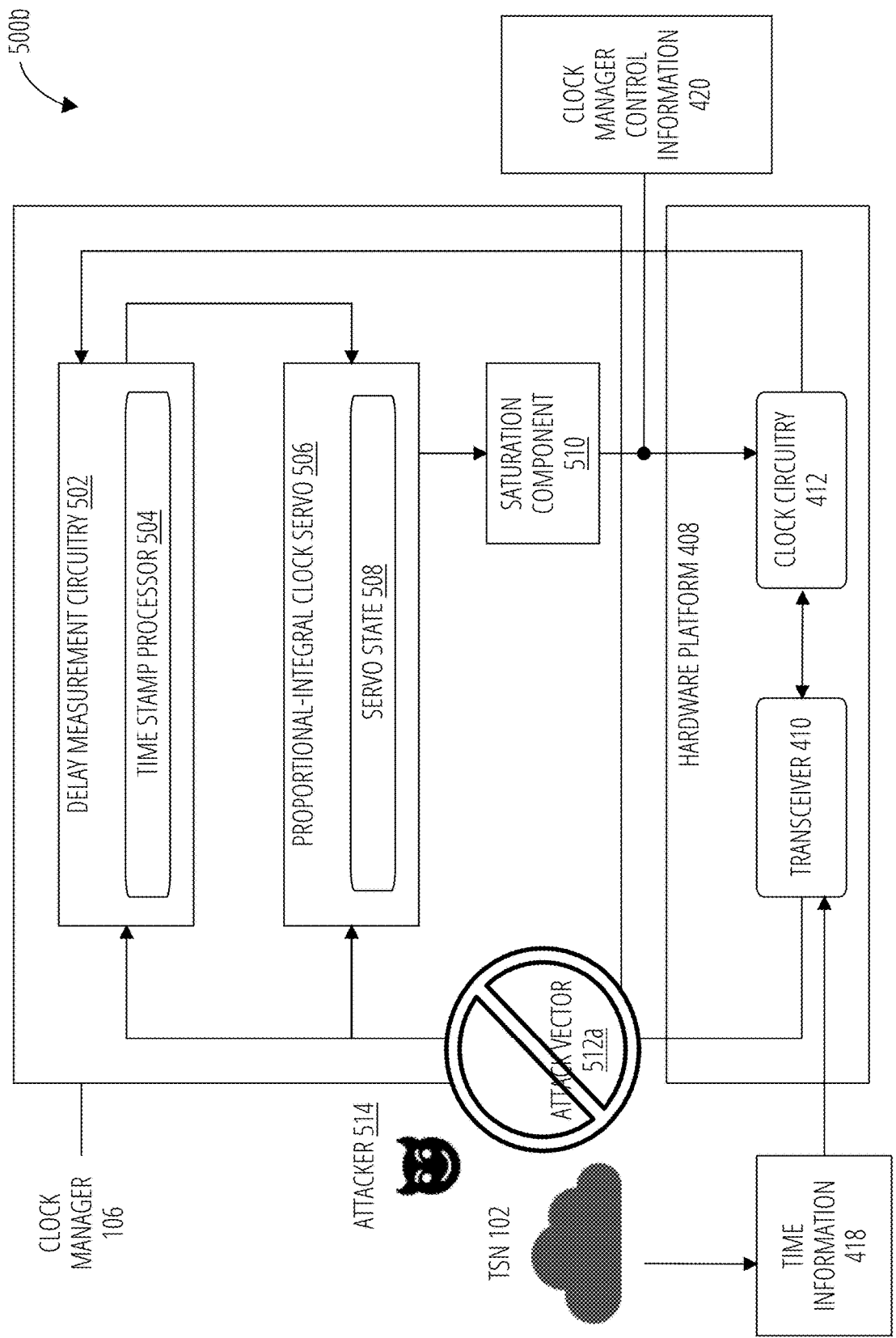
FIG. 5B illustrates an aspect of an apparatus 500b in accordance with one embodiment.

FIG. 5B illustrates the clock manager 106 under a first attack scenario. As depicted in FIG. 5B, assume an attacker 514 attempts a first attack vector 512a through sensing. The attacker 514 may attempt to modify timing values in the time information 418 after receipt by the transceiver 410 and before they are consumed by the proportional-integral clock servo 506. In other words, the first attack vector 512a is on input values for the clock manager 106.

Figure 5C:
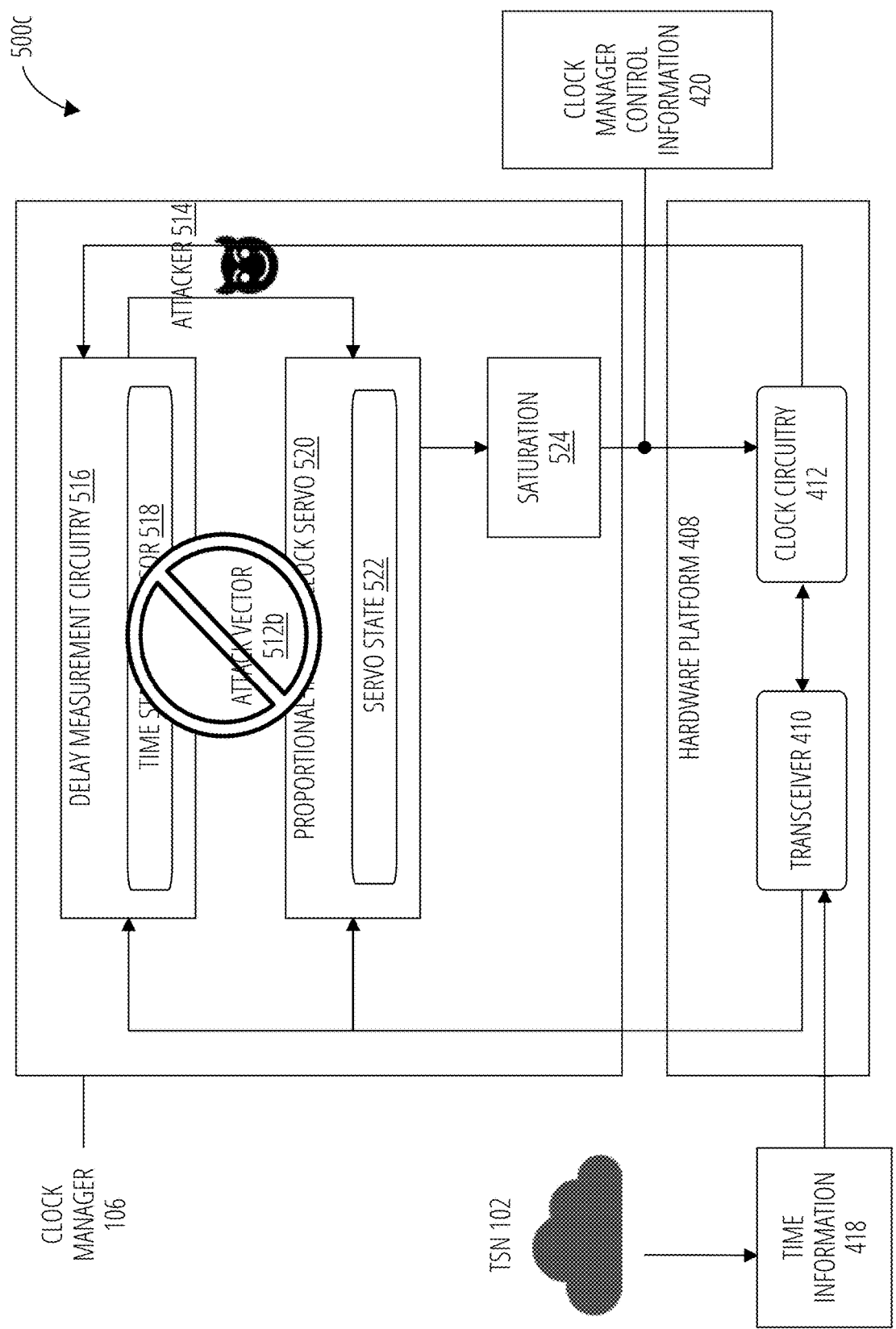
FIG. 5C illustrates an aspect of an apparatus 500c in accordance with one embodiment.

FIG. 5C illustrates the clock manager 106 under a second attack scenario. As depicted in FIG. 5C, assume the attacker 514 attempts a second attack vector 512b through control. The attacker 514 may attempt to modify the control code computing actuation (e.g., frequency adjustment) based on sensing (e.g., offset). In other words, the second attack vector 512b is on the actual code used to implement the clock manager 106.

Figure 5D:
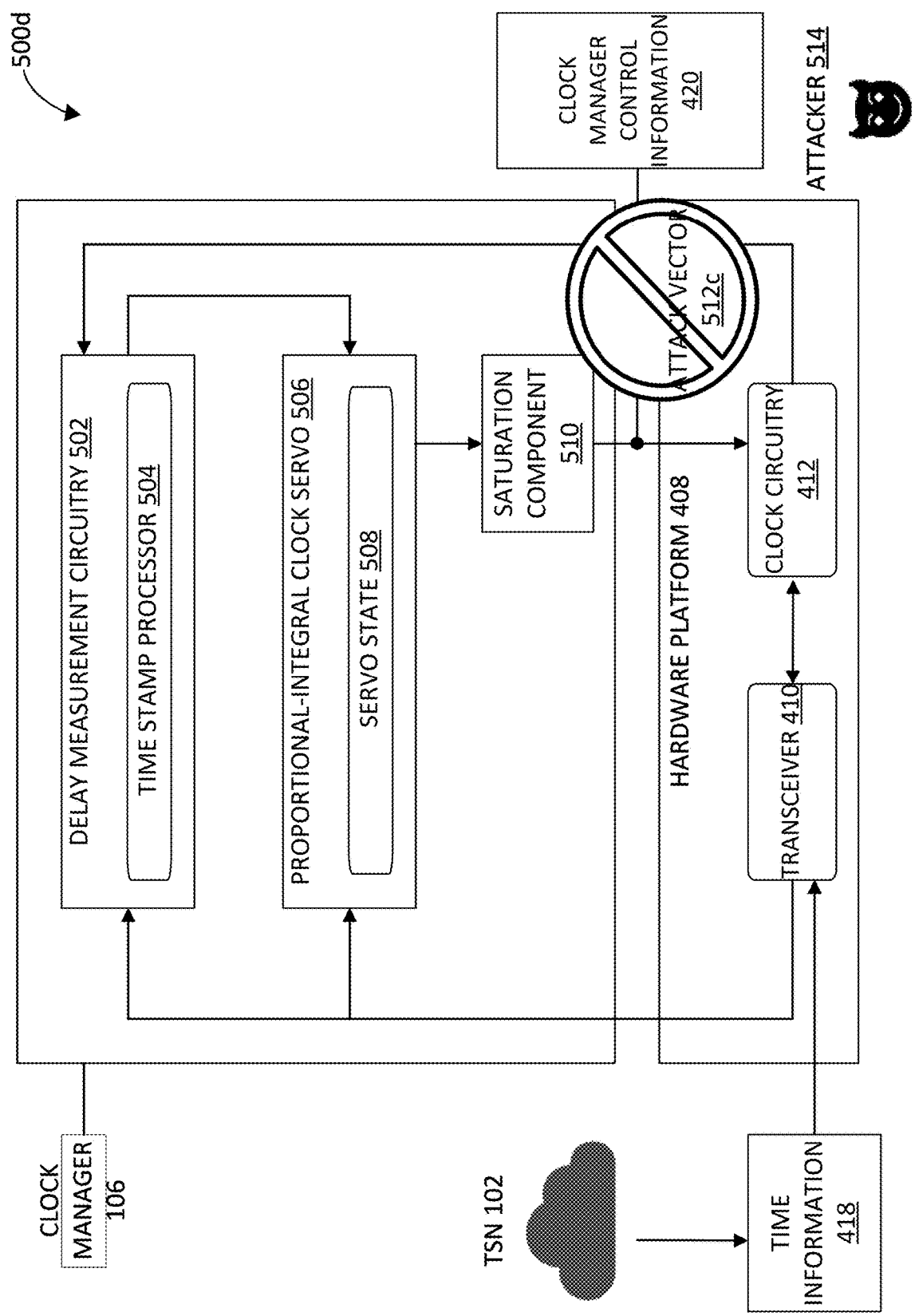
FIG. 5D illustrates an aspect of an apparatus 500d in accordance with one embodiment.

FIG. 5D illustrates the clock manager 106 under a third attack scenario. As depicted in FIG. 5D, assume the attacker 514 attempts a third attack vector 512c through actuation. The attacker 514 may attempt to modify frequency adjustment values of the clock manager control information 420 as computed by the proportional-integral clock servo 506 and sent to the clock circuitry 412 for implementation. In other words, the third attack vector 512c is on output values from the clock manager 106.

As illustrated in FIGS. 5A-5D, implementation of a clock manager 106 as a PTP4L proportional-integral (PI) controller presents several security concerns. However, if the clock synchronization process is described using physical models, these models can be employed as analytical redundancy, such as an equation-based copy of the system. The models can be efficiently executed at runtime in parallel to the actual clock manager 106, and serve as a basis for anomaly/attack detection. While some embodiments instantiate a modeling approach on the example of a PTP4L clock manager, it may be appreciated that the framework is not limited to PI-based clock servos.

Figure 6:
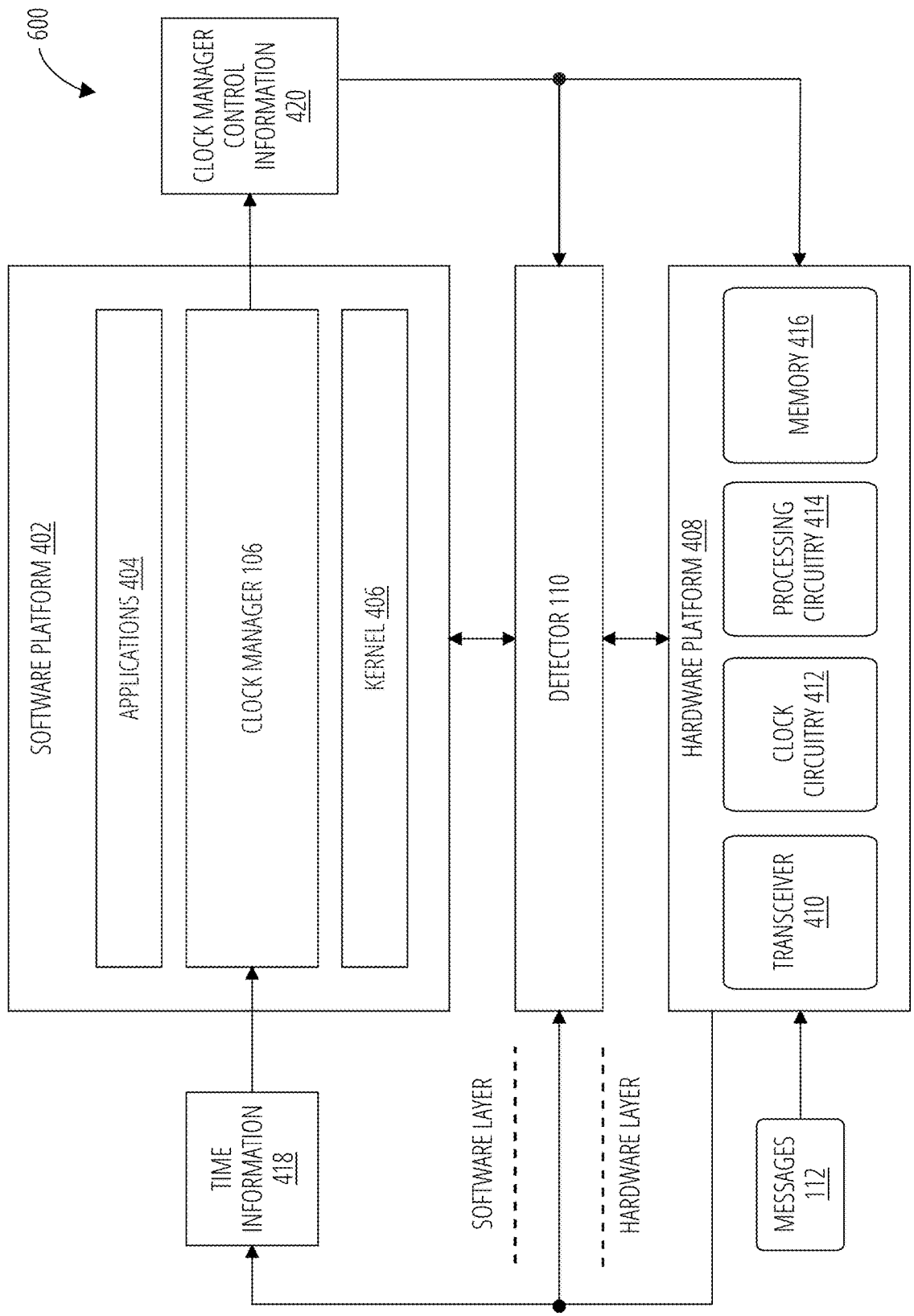
FIG. 6 illustrates an aspect of an apparatus 600 in accordance with one embodiment.

FIG. 6 illustrates an apparatus 600. Similar to the apparatus 400, the apparatus 600 includes a software platform 402 and a hardware platform 408. In addition, the apparatus 600 includes a detector 110 to monitor a clock manager 106 of the software platform 402. As previously discussed, the detector 110 generally monitors the clock manager 106 to detect abnormal or malicious behavior of the clock manager 106. More particularly, the detector 110 monitors the inputs and/or outputs of the clock manager 106, such as consuming the time information 418 sent from the transceiver 410 to the clock manager 106 as input, and the clock manager control information 420 sent from the clock manager 106 to the clock circuitry 412 as output.

As depicted in FIG. 6, the apparatus 600 includes a clock circuitry 412 to implement a hardware clock (e.g., a PHC) for a device, such as a TSN node 104. The apparatus 600 includes a processing circuitry 414 coupled to the clock circuitry 412, the processing circuitry 414 to execute instructions to perform operations for a clock manager 106. The clock manager 106 is operative to receive messages 112 with time information 418 for a network, such as TSN 102. The clock manager 106 generates clock manager control information 420 to adjust the clock circuitry 412 to a network time for the TSN 102. The clock manager control information 420 may comprise one or more parameters to adjust the clock circuitry 412 for the apparatus 600. The one or more parameters may represent, for example, adjustments to a phase or frequency of the clock circuitry 412. For example, the clock manager control information 420 may comprise a phase or frequency adjustment based on a time offset between a reference time and a time maintained by the clock circuitry 412. The reference time is based on the time information 418 in at least one message 112.

The apparatus 600 further includes a detector 110 coupled to the processing circuitry 414 and the clock circuitry 412. In one embodiment, the detector 110 may be implemented as part of a software layer for the apparatus 600, such as the software platform 402. In another embodiment, the detector 110 may be implemented as part of a hardware layer for the apparatus 600, such as the hardware platform 408. In yet another embodiment, certain elements of the detector 110 may be implemented in the software platform 402, while other elements of the detector 110 may be implemented in the hardware platform 408. Embodiments are not limited in this context.

Although FIG. 6 depicts the detector 110 implemented as part of the apparatus 600, it may be appreciated that the detector 110 may be implemented by another apparatus, device or system communicatively coupled to the apparatus 600. For instance, the detector 110 may be implemented as part of an intrusion detection system (IDS) for the apparatus 600 that is separate from the apparatus 600 or a device other than a device that implements the apparatus 600. For instance, if the apparatus 600 is implemented by a TSN node 104a, the detector 110 of the apparatus 600 could optionally be implemented in a TSN node 104b. The detector 110 could also be implemented by an IDS communicatively coupled to the TSN node 104, either directly via a wired or wireless connection, or indirectly via the TSN fabric 114. Embodiments are not limited in this context.

The detector 110 is operative to consume the clock manager control information 420 in transit from the clock manager 106 of the software platform 402 and the hardware platform 408. For instance, the detector 110 can consume software control messages, or it can have one or more taps on a hardware bus or signal lines used to communicate electrical signals to the hardware platform 408. The detector 110 analyzes the clock manager control information 420, and determines whether to generate an alert or take corrective action for the apparatus 600 based on results of the analysis.

Figure 7:
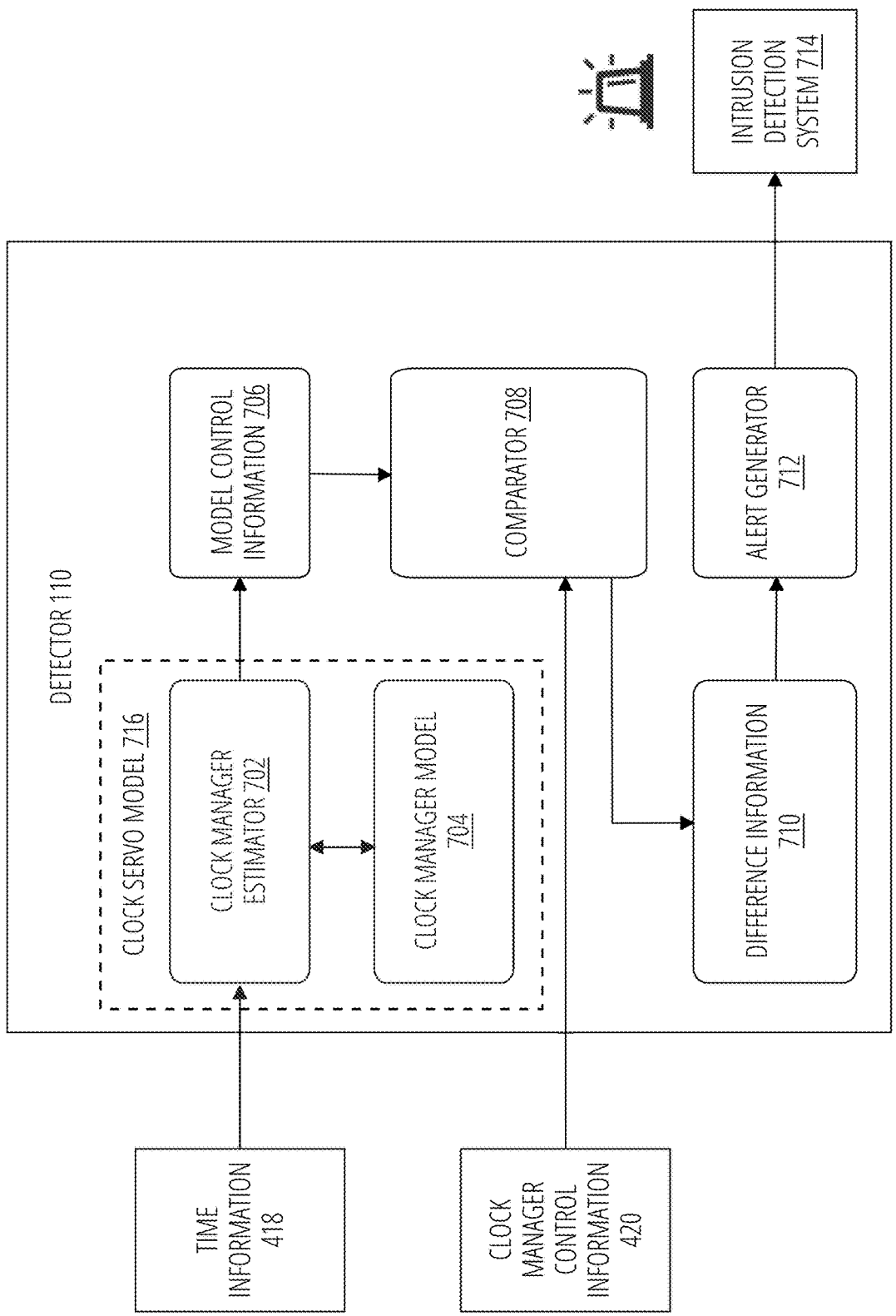
FIG. 7 illustrates an aspect of a detector 110 in accordance with one embodiment.

FIG. 7 illustrates a more detailed view of a detector 110. As depicted in FIG. 7, a detector 110 may include a clock servo model 716, model control information 706, a comparator 708, difference information 710, and an alert generator 712. The clock servo model 716 may comprise a clock manager estimator 702 and a clock manager model 704. The detector 110 can be communicatively coupled to an intrusion detection system 714.

In operation, the detector 110 receives at least two inputs. The two inputs include the time information 418 from the transceiver 410 and the clock manager control information 420 from the clock manager 106. The clock manager estimator 702 receives the time information 418, and uses the time information 418 to generate model control information 706 based on a set of equations and algorithms implemented for the clock manager model 704.

In general, the detector 110 attempts to generate model control information based on a behavior of the clock manager 106. The detector 110 may generate model control information in a number of different ways. For instance, as previously discussed, the detector 110 may use different statistical models in an attempt to model behavior of the clock manager 106. However, statistical models are typically compute-intensive and memory-intensive and may not be suitable for real-time threat monitoring.

As described with reference to FIGS. 5A-D, the clock manager 106 may be implemented as a PTP4L clock manager software module. The PTP4L clock manager software module is a physics-based controller, which is derived based on control theoretic principles, as is the case with most prominent clock servos for Linux. Since the proportional-integral clock servo 506 is a physics-based controller, an optimal modeling technique is a physics-based one. Any other technique, such as those based on statistical behavior, will likely be suboptimal for security operations.

In one embodiment, the detector 110 may implement a clock manager model 704 that comprises a physics-based analytical model to represent physical relationships between components of a system. The physics-based analytical model is implemented as an equation-based representation of a behavior of the clock manager 106. More particularly, the physics-based analytical model is implemented as an equation-based representation of a clock servo controller, such as the proportional-integral clock servo 506, as well as the time stamp processor 504 and the delay measurement circuitry 502.

Referring again to FIG. 7, the comparator 708 receives as input the model control information 706 from the clock manager estimator 702, as well as the clock manager control information 420 from the clock manager 106. The comparator 708 compares the clock manager control information 420 with the model control information 706 to generate difference information 710. The difference information 710 is basically a differential or residual between the clock manager control information 420 and the model control information 706.

The alert generator 712 receives the difference information 710 as input. The alert generator 712 determines whether to generate an alert based on the difference information 710. For instance, the alert generator 712 of the detector 110 is operative to determine whether to generate an alert based on the difference information 710, the alert generator 712 to compare the difference information 710 measured periodically to a defined threshold representing a value in parts per billion (ppb) for frequency adjustment, or nanoseconds (ns) for phase adjustment. More particularly, the alert generator 712 of the detector 110 is operative to determine whether to generate an alert based on the difference information 710, the detector 110 to compare the difference information 710 measured every synchronization cycle to a defined threshold represented in units of ppb for frequency adjustment, the defined threshold to be equal to or greater than 0.1 ppb, 1 ppb, 5 ppb, 10 ppb, and so forth. Similarly, the detector 110 can compare the difference information 710 measured to a defined threshold represented in units of nanoseconds (ns) for phase adjustment. Other measurement periods and values for defined thresholds may be implemented based upon a number of factors, such as a given software platform 402, hardware platform 408, transceiver 410, applications 404, level of operational security, real-time detection, off-line detection, and other considerations.

Figure 8A:
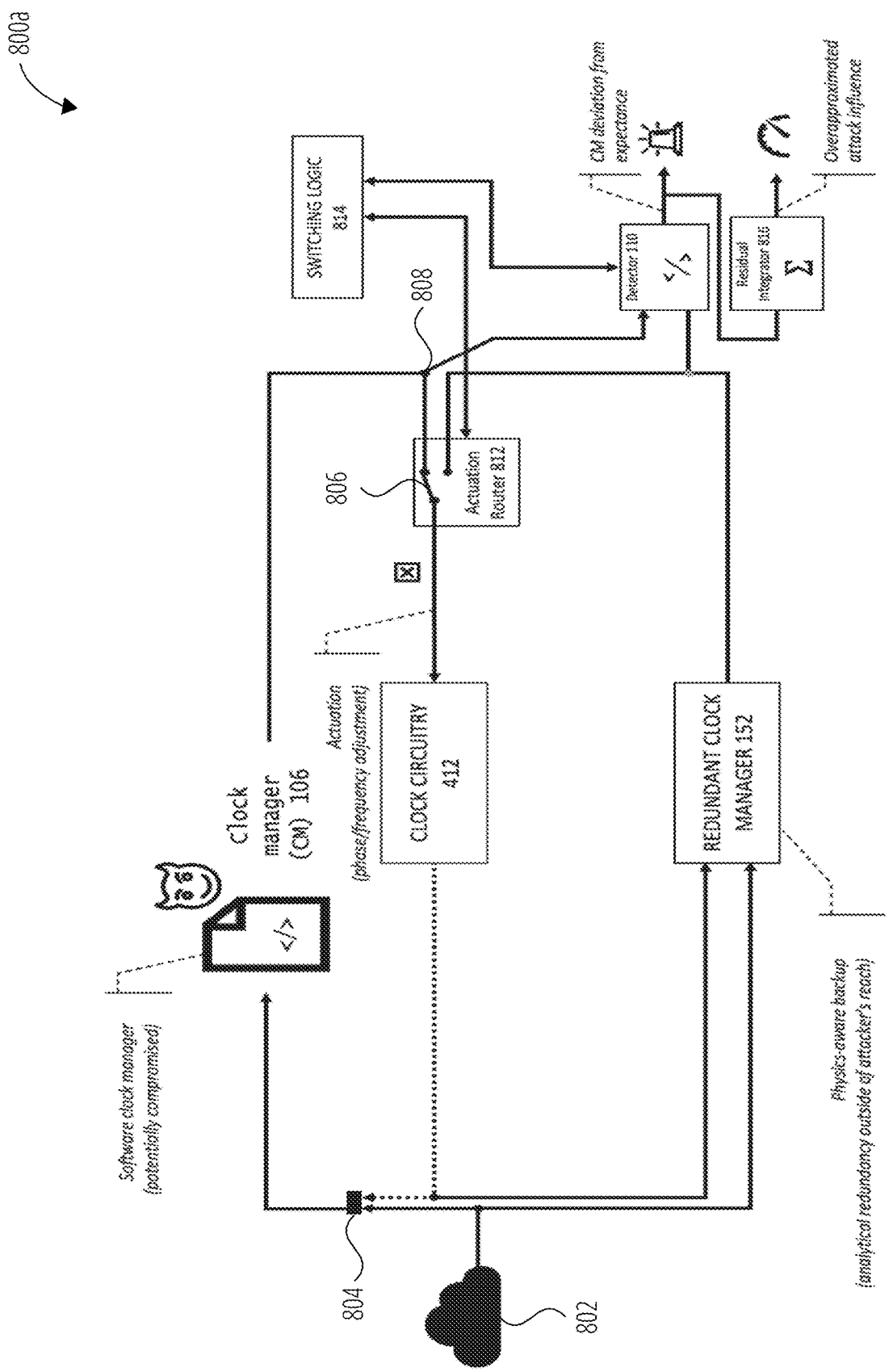
FIG. 8A illustrates an aspect of an apparatus 800a in accordance with one embodiment.
Figure 8B:
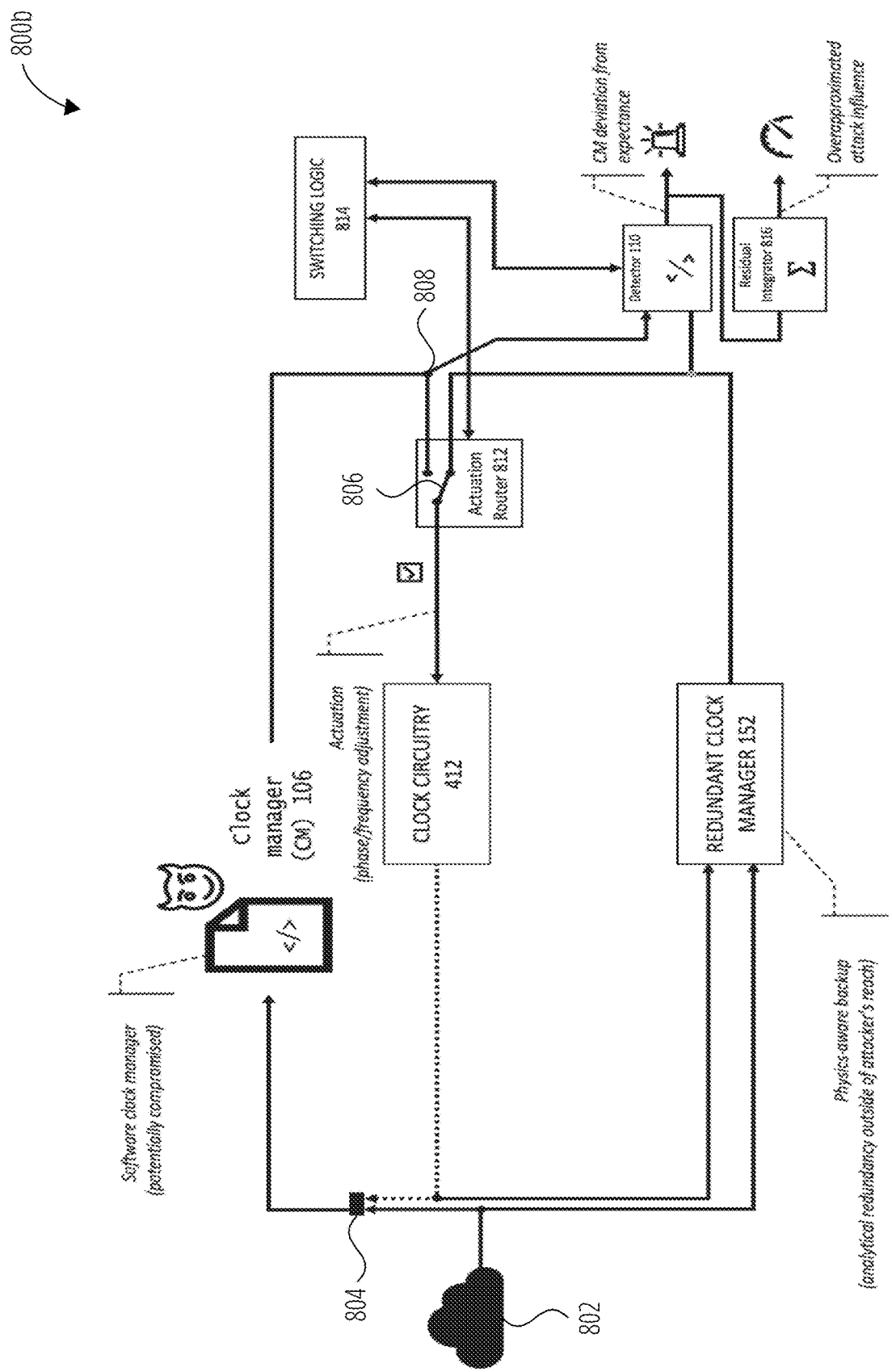
FIG. 8B illustrates an aspect of an apparatus 800b in accordance with one embodiment.

FIGS. 8A, 8B illustrate apparatus 800a, 800b, respectively. As depicted in both FIGS. 8A, 8B, a detector 110, switching logic 814 and an actuation router 812 operate in combination to switch a connection path between the clock manager 106 and the clock circuitry 412 to a connection path between the redundant clock manager 152 and the clock circuitry 412.

As depicted in FIG. 8A, the apparatus 800a illustrates an example implementation for a TSN node 104 similar to the apparatus 600. As with the apparatus 600, the apparatus 800a includes the clock manager 106, the clock circuitry 412, and the detector 110. In addition, the apparatus 800a includes a network interface 802, a direct tap 804, a direct tap 808, the redundant clock manager 152, an actuation router 812, a switching logic 814, and a residual integrator 816.

The apparatus 800a illustrates the detector 110 receiving as input time information 418 (not shown) received by the network interface 802 via a direct tap 804 and the redundant clock manager 152. The direct tap 804 reduces a risk that signals received by the network interface 802 and sent as input to the detector 110 are under influence of an attacker. For instance, an attacker may attempt to intercept and modify the time information 418 to affect sensing by the clock manager 106 of one set of values, and report another set of values to the detector 110. The direct tap 804 reduces this risk and thereby improves security for the detector 110.

Similarly, the clock manager 106 outputs clock manager control information 420 (not shown), which is received as input by the detector 110 via a direct tap 808. The direct tap 808 reduces a risk that signals received as input by the detector 110 are under influence of an attacker. For instance, an attacker may attempt to intercept and modify the clock manager control information 420 to actuate the clock circuitry 412 with one set of values, and report another set of values to the detector 110. The direct tap 808 reduces this risk and thereby improves security for the detector 110.

The detector 110 receives the clock manager control information 420 (not shown) from the clock manager 106 and model control information 706 (not shown) from the clock manager 106, compares the information to generate difference information 710 (not shown) or a residual, which represents the deviation from expected behavior of the clock manager 106. When the detector 110 identifies a deviation from expected behavior representing abnormal behavior of the clock manager 106, the detector 110 determines that the clock manager 106 is potentially compromised. The detector 110 can then generate an alarm and send the alarm to an IDS.

In addition to generating the alarm, the detector 110 can also send a control signal to the switching logic 814. The switching logic 814 controls a position for a switch 806 of an actuation router 812. The control signal configures the switch 806 for the actuation router 812 to pass signals from the redundant clock manager 152 to the clock circuitry 412. The redundant clock manager 152 is a physics-aware backup that executes on separate processing circuitry, such as within a hardened execution environment, from the processing circuitry executing the clock manager 106. In this manner, the redundant clock manager 152 provides analytical redundancy outside of a reach of the attacker 514 and isolates the redundant clock manager 152 from infections from the clock manager 106. The redundant clock manager 152 may be designed to take over operations for the clock manager in response to the alert from the detector 110.

The actuation router 812 is coupled to the switching logic 814. The actuation router 812 receives control signals from the switching logic 814 to switch between alternate connection paths for the clock circuitry 412. During normal operations for a TSN node 104, the actuation router 812 receives control signals from the switching logic 814 to move the switch 806 to a first position. The first position completes a first connection path between the clock manager 106 and the clock circuitry 412. The first connection path allows the clock manager 106 to output clock manager control information 420 (phase/frequency adjustments) to the clock circuitry 412 to adjust timing for the clock.

FIG. 8B illustrates an apparatus 800b. The apparatus 800b is similar to apparatus 800a. Apparatus 800b illustrates a case where the clock manager 106 is compromised due to a security attack. As depicted in FIG. 8B, when the clock manager 106 is compromised, the actuation router 812 receives control signals from the switching logic 814 to move the switch 806 to a second position. The second position completes a second connection path between the redundant clock manager 152 and the clock circuitry 412. The second connection path allows the redundant clock manager 152 to output model control information (phase/frequency adjustments) to the clock circuitry 412 to adjust timing for the clock. The model control information operates as substitute timing control signals for the clock manager control information 420.

As depicted in both FIGS. 8A, 8B, the detector 110 is coupled to a residual integrator 816. The residual integrator 816 receives residual signals from the detector 110. The residual integrator 816 analyzes the residual signals to adjust accuracy of the detector 110 over time. As the clock servo model 716 of the detector 110 executes over time, there occurs a condition where the clock servo model 716 may over-approximate an attack influence. This may lead to an increase in false positives for a security threat. The residual integrator 816 provides information that can be analyzed off-line by a security researcher to evaluate attack amplitude and aid forensic examination. The results of the forensic examination can be used to refine one or more threshold parameters used by the detector 110 to detect a security attack. In one embodiment, the residual integrator 816 may provide feedback directly to the clock servo model 716 of the detector 110 to perform real-time adjustments to the threshold parameters.

Figure 9:
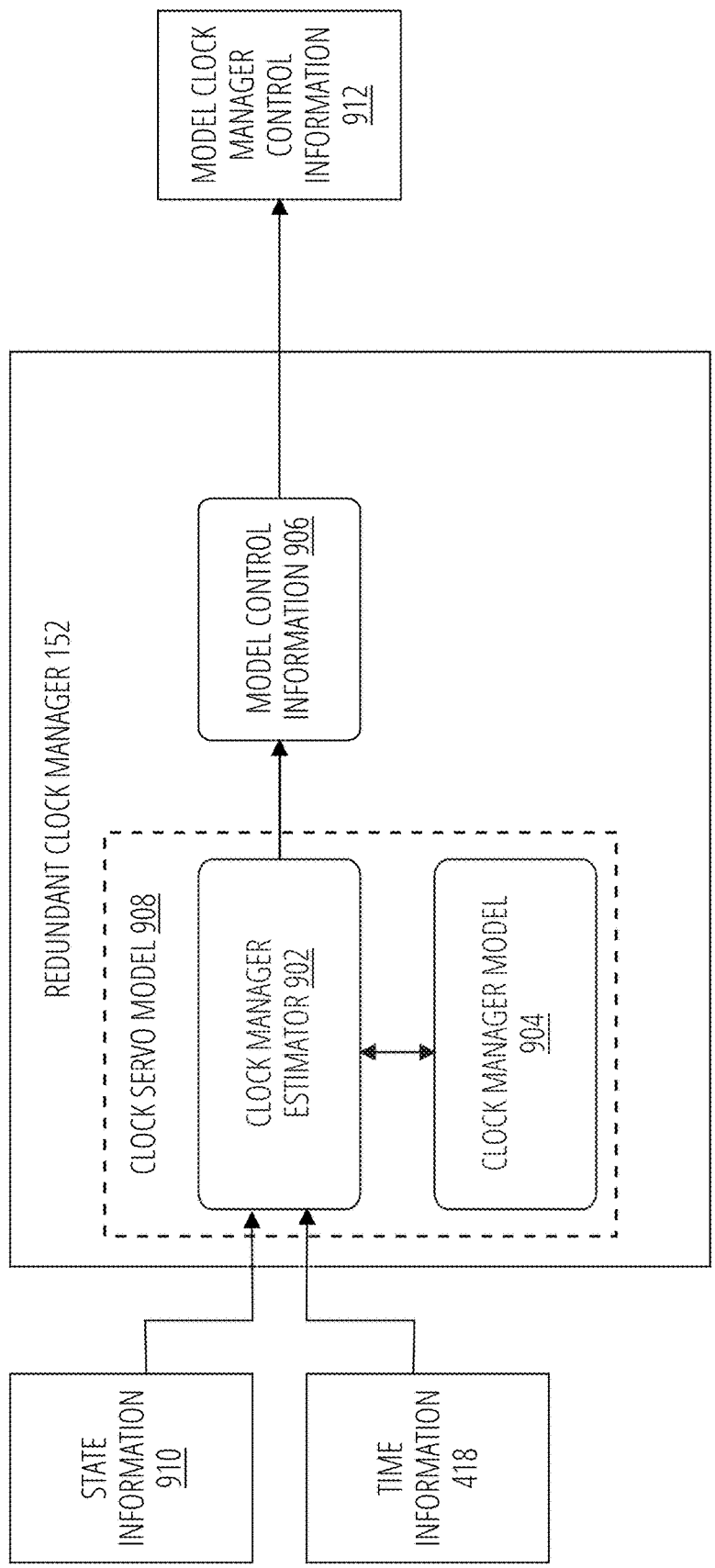
FIG. 9 illustrates an aspect of a redundant clock manager 152 in accordance with one embodiment.

FIG. 9 illustrates a more detailed diagram for the redundant clock manager 152. As depicted in FIG. 9, the redundant clock manager 152 comprises a clock servo model 908. In one embodiment, the clock servo model 908 is the same or similar to the clock servo model 716 used by the detector 110. As with the clock servo model 716, the clock servo model 908 implements a physics-based model. The physics-based approach for the clock servo model 908 utilizes state prediction based on physical models of system dynamics. Unlike conventional information-based security measures, the physics-based model may utilize physical properties of a system, along with controller state estimation, to enable computationally-inexpensive analytical redundancy. For example, a mathematical model-based replica of the system is simultaneously executed to detect attacks.

As described with reference to the clock manager 106, the redundant clock manager 152 may be implemented as a PTP4L clock manager software module. The PTP4L clock manager software module is a physics-based controller, which is derived based on control theoretic principles, as is the case with most prominent clock servos for Linux. Since the proportional-integral clock servo 506 is a physics-based controller, an optimal modeling technique is a physics-based one. Any other technique, such as those based on statistical behavior, will likely be suboptimal for security operations.

In one embodiment, the redundant clock manager 152 may implement a clock servo model 908 that comprises a physics-based analytical model to represent physical relationships between components of a system. The physics-based analytical model is implemented as an equation-based representation of a behavior of the clock manager 106. More particularly, the physics-based analytical model is implemented as an equation-based representation of a clock servo controller, such as the proportional-integral clock servo 506, as well as the time stamp processor 504 and the delay measurement circuitry 502, as described with reference to FIGS. 5A-5D.

In one embodiment, the redundant clock manager 152 receives state information 910 from the clock servo model 716. The clock manager estimator 902 of the clock servo model 908 can update parameters for the clock manager estimator 902 and/or the clock manager model 904 to match a current state for the clock servo model 716 used by the detector 110. Once updated, the redundant clock manager 152 can use the clock servo model 908 to generate model control information 906. The model control information 906 provides predicted or estimated timing synchronization signals that mimic or closely approximate the clock manager control information 420 generated by the clock manager 106.

Once the redundant clock manager 152 is connected to the clock circuitry 412 via the actuation router 812, the redundant clock manager 152 uses the clock servo model 908 to generate model clock manager control information 912. As depicted in FIG. 9, the clock servo model 908 comprises a clock manager estimator 902 and a clock manager model 904. The clock manager estimator 902 is operative to receive as input one or more messages with time information 418 for a time sensitive network 102, generate model control information 906 based on the clock manager model 904, and output model clock manager control information 912 based on the model control information 906 to the clock circuitry 412. In this manner, the redundant clock manager 152 can smoothly and seamlessly take over timing operations for the clock circuitry 412 without disrupting operations of the TSN node 104 or applications that depend on timing information from the clock circuitry 412.

Figure 10:
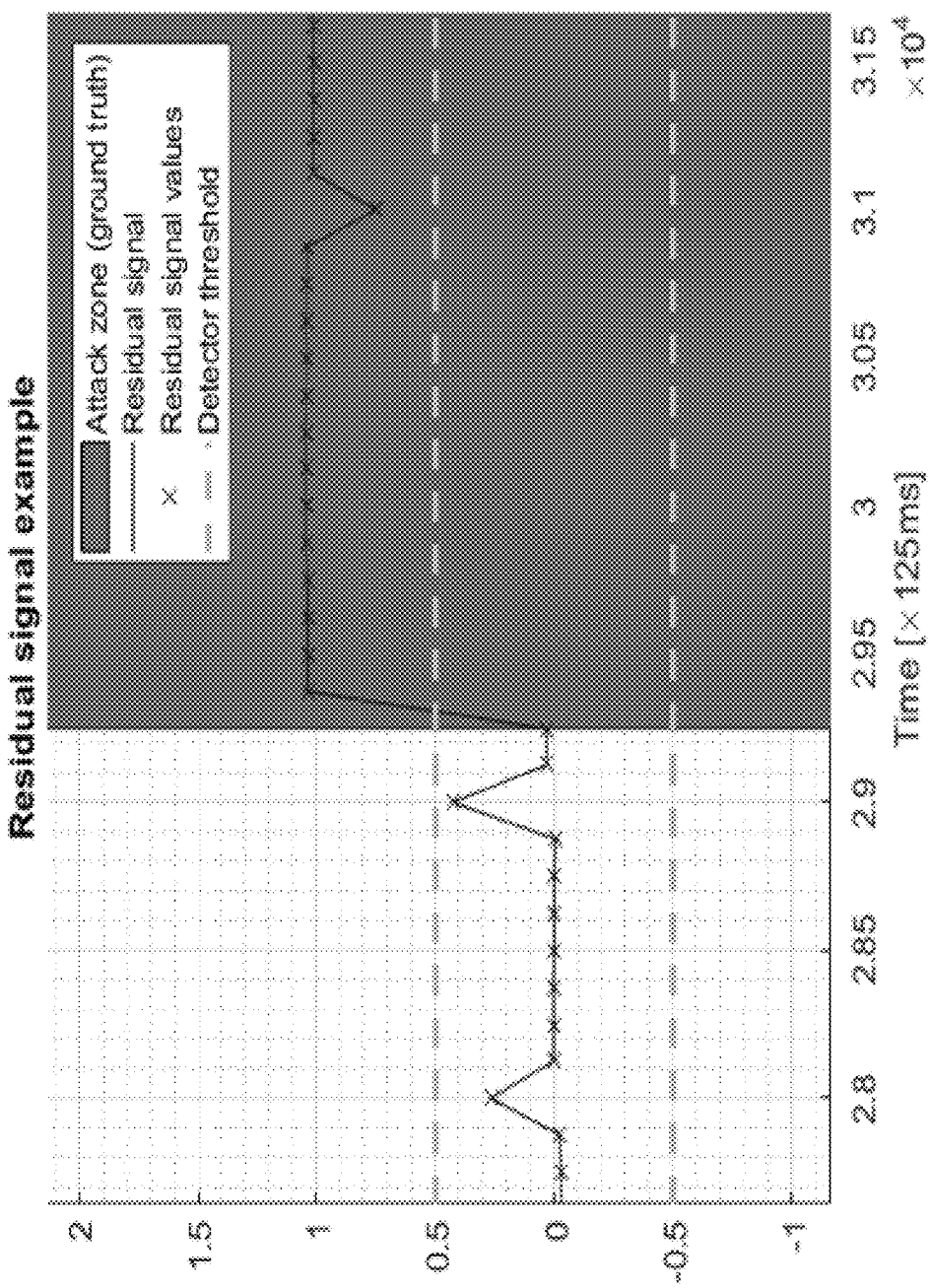
FIG. 10 illustrates an aspect a chart 1000 in accordance with one embodiment.

FIG. 10 illustrates a chart 1000 that provides an example of a residual signal. As previously discussed, the residual integrator 816 is a mechanism to evaluate an attack amplitude and aid forensics of residual signals outputted by the detector 110. The chart 1000 provides an example residual signal for a live TSN node 104 running IEEE 802.1AS time synchronization over Ethernet where the synchronization interval is 125 milliseconds (ms). The y-axis of the chart 1000 has values that represent differences between expected and actual clock control signals in parts per billion (ppb). The x-axis of the chart 1000 has values that represent time in milliseconds (ms). The solid line represents a residual signal generated by the detector 100 and/or the residual integrator 816. The "x" symbols represent residual signal values. The dashed lines represent a pair of threshold values (0.5, −0.5) for the detector 110 to detect a security attack.

The detector 110 may determine whether to generate an alert based on difference information or values for the residual signal as compared to one or more defined threshold values. The detector 110 may compare the difference information measured periodically to a defined threshold representing a value in parts per billion (ppb). For instance, the detector 110 may compare the difference information measured every synchronization cycle to a defined threshold represented in units of parts per billion (ppb). The defined threshold values may be set based on a given apparatus, device, system or network. In one embodiment, for example, the defined threshold values may be set to be equal to or greater than 1.0 ppb or −1.0 ppb. In one embodiment, for example, the defined threshold values may be set to equal to or less than 1 ppb, such as 0.5 ppb or −0.5 ppb. It may be appreciated that these are merely examples, and the defined thresholds for the detector 110 may vary upon implementation. The embodiments are not limited in this context.

Referring again to the example residual signal shown in chart 1000, when the residual signal is under the threshold value of 0.5, this indicates that the clock manager 106 is behaving as expected and within normal tolerances. However, when the residual signal is above the threshold value of 0.5, this indicates that the clock manager 106 is deviating from expected behavior and is exhibiting characteristics of abnormal behavior. When the detector 110 detects the residual signal above the threshold value of 0.5, the detector 110 takes several actions in no particular order. First, the detector 110 generates a control signal to the switching logic 814 to initiate re-routing of the clock manager application program interface (API) used by one or more applications that consume time information from the clock manager 106 to the redundant clock manager 152. Second, the detector 110 initiates re-routing of the clock manager control information 420 from the clock manager 106 to the redundant clock manager 152. Third, the detector 110 assesses whether the attack amplitude of the residual signal is 1 ppb per synchronization cycle.

Referring again to the example residual signal shown in the chart 1000, when the residual signal is under the threshold value of 0.5, this indicates that the clock manager 106 is behaving as expected. As depicted in the chart 1000, starting at time 0, the residual signal remains close to a value of 0 ppb. At times 2.8, 2.9 there are a pair of relatively small spikes in the residual signal to approximately 0.3, 0.4 ppb, respectively. However, both spikes are below the threshold value of 0.5. At a time between 2.9 and 2.95, the residual signal spikes to approximately 1 ppb, which is above the threshold value of 0.5. At this time, the detector 110 detects a security attack on the clock manager 106, which is represented as a dark grey area of the chart 1000.

It is worth to note that the example residual signal shown in the chart 1000 is produced by a system executing without a switch to the redundant clock manager 152. When a system implements the redundant clock manager 152, switching from the primary clock servo of the clock manager 106 under attack to the redundant clock servo model of the redundant clock manager 152, that is part of the hardened execution environment, the residual signal is reduced to zero.

Figure 11:
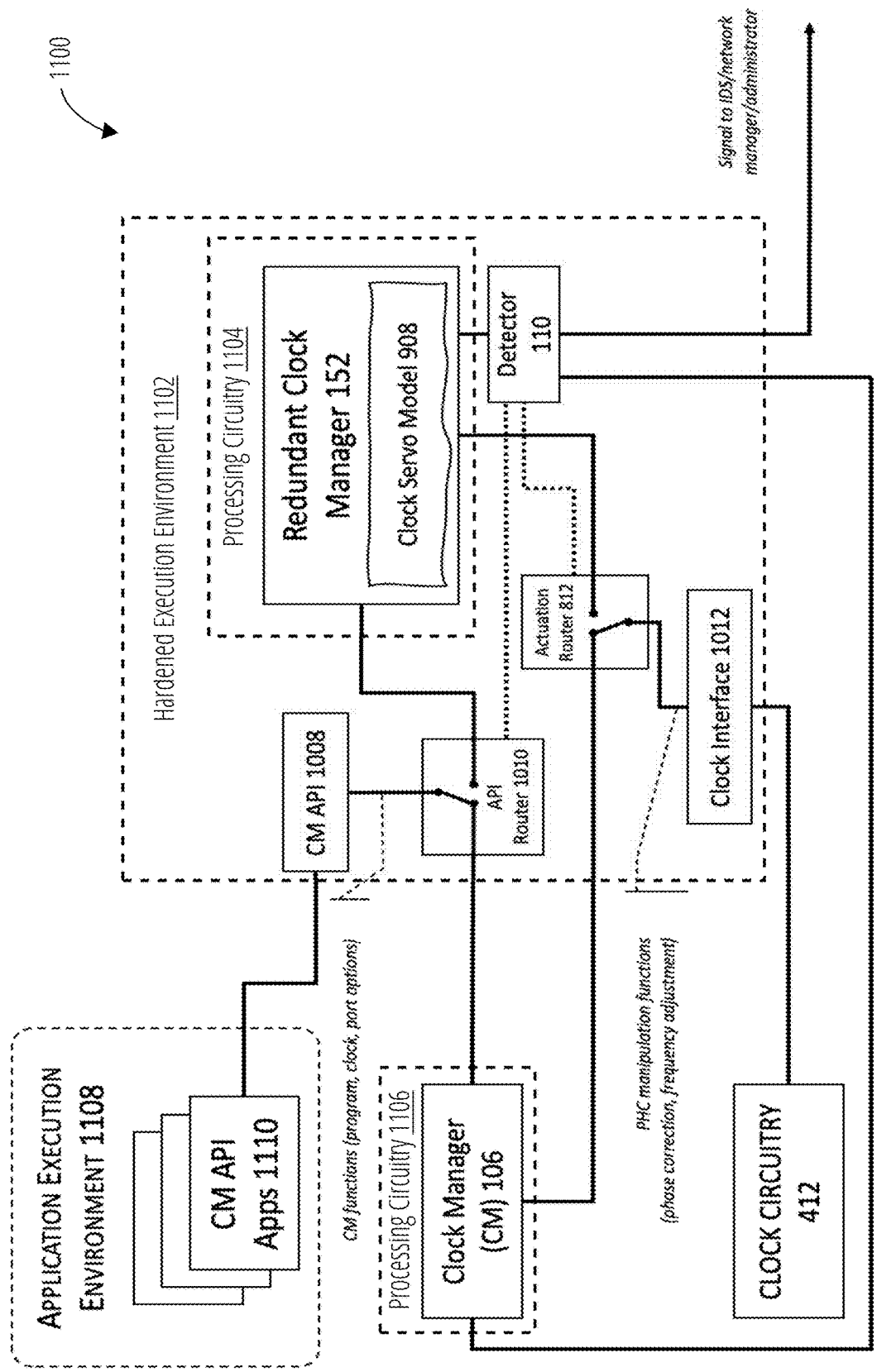
FIG. 11 illustrates an aspect of a system 1100 in accordance with one embodiment.

FIG. 11 illustrates a system 1100. The system 1100 is an example of a TSN node 104 implementing all the features of the apparatus 400, the apparatus 600 and the apparatus 800. In addition, the system 1100 further includes a hardened execution environment 1102, processing circuitry 1104, processing circuitry 1106, an application execution environment 1108, and a set of clock manager (CM) API applications (apps) 1110.

As depicted in FIG. 11, the hardened execution environment 1102 comprises the processing circuitry 1104 to execute instructions for the redundant clock manager 152 implementing the clock servo model 908. The hardened execution environment 1102 may comprise, for example, a trusted platform module (TPM) hardware platform, a TCB hardware platform, or some other security platform that implements a separate and protected execution environment for hardware, software and firmware. In one embodiment, for example, the hardened execution environment 1102 can be implemented as a TPM. A TPM is a physical or embedded security technology (microcontroller) that resides on a computer's motherboard or in its processor. TPMs use cryptography to help securely store essential and critical information on a computer to enable platform authentication. They store a variety of sensitive information—such as user credentials, passwords, fingerprints, certificates, encryption keys, or other important consumer documentation—behind a hardware barrier to keep it safe from external attacks. A TPM can also comprise a security chip that executes software and firmware in a secure and protected manner.

The redundant clock manager 152 may be coupled to the detector 110, the actuation router 812 and an API router 1010. The clock servo model 908 of the redundant clock manager 152 can exchange state information with the clock servo model 716 of the detector 110. Since the clock servo model 716 stores current state information used to predict or estimate time actuations for the clock manager 106, the clock servo model 716 always remains up-to-date with any time synchronization information needed for making its estimates and predictions. The clock servo model 716 of the detector 110 can synchronously or asynchronously send state information to the clock servo model 908 of the redundant clock manager 152. In this manner, the redundant clock manager 152 is kept on hot or warm standby to seamlessly take over timing management operations for the clock circuitry 412.

The actuation router 812 is coupled to the clock circuitry 412 via a clock interface 1012 for the hardened execution environment 1102. The actuation router 812 is also coupled to the clock manager 106 executing on the processing circuitry 1106. In the system 1100, the switching logic (not shown) to control the actuation router 812 can be implemented as part of the redundant clock manager 152, the detector 110, the actuation router 812, a separate switch logic 814, or some other component of the system 1100.

The API router 1010 is coupled to the application execution environment 1108 via a CM API interface 1008. The API router 1010 is also coupled to the clock manager 106 executing on the processing circuitry 1106 through an appropriate interface.

The application execution environment 1108 executes instructions for one or more CM API applications 1110. The CM API applications 1110 implement one or more CM APIs to consume time information from the clock manager 106 or the redundant clock manager 152, which in turn represents a network time for the time sensitive network 102, of which the TSN node 104 is part. The CM API applications 1110 are time-sensitive applications that can operate in an unpredictable manner when consuming incorrect time information from the time sensitive network 102. For instance, assume a CM API application 1110 is an autonomous driving application for an autonomous vehicle. Incorrect time information can cause the autonomous driving application to deviate from a lane or apply brakes too late, causing injury to humans or property.

When the detector 110 detects abnormal behavior of the clock manager 106, the detector 110 can send an alert signal to an IDS, a network administrator, a security information and event management (SIEM) system, other TSN nodes 104, and other components or devices of the time sensitive network 102.

In addition, when the detector 110 detects abnormal behavior of the clock manager 106, the detector 110 can send control signals to the redundant clock manager 152 and/or the actuation router 812 to initiate take-over operations for the redundant clock manager 152. When this occurs, the actuation router 812 changes a position for the switch 806 to complete a connection path between the redundant clock manager 152 and the clock circuitry 412 via the clock interface 1012. The redundant clock manager 152 then generates model control information 906 which is converted into model clock manager control information 912 suitable for the clock circuitry 412.

At or around the same time, the detector 110 can send control signals to the redundant clock manager 152 and/or the API router 1010 to allow the CM API applications 1110 to start receiving timing information from the redundant clock manager 152. Similar to the actuation router 812, the API router 1010 includes a switch to complete different connection paths.

During normal operations for a TSN node 104, the API router 1010 receives control signals from switching logic to move a switch to a first position. The first position completes a first connection path between the clock manager 106 and the CM API applications 1110 executing in the application execution environment 1108. The first connection path allows the clock manager 106 to output time information for a current network time (and CM functions such as programs, clock, port options) to the CM API applications 1110 via the CM API interface 1008.

When the clock manager 106 is compromised, the API router 1010 receives control signals from the switching logic to move the switch to a second position. The second position completes a second connection path between the redundant clock manager 152 and the CM API applications 1110 executing in the application execution environment 1108. The second connection path allows the redundant clock manager 152 to output time information for a current network time (and CM functions such as programs, clock, port options) to the CM API applications via the CM API interface 1008. The time information is derived from the model control information 906 and operates as substitute timing control signals for the CM API applications 1110.

Figure 12:
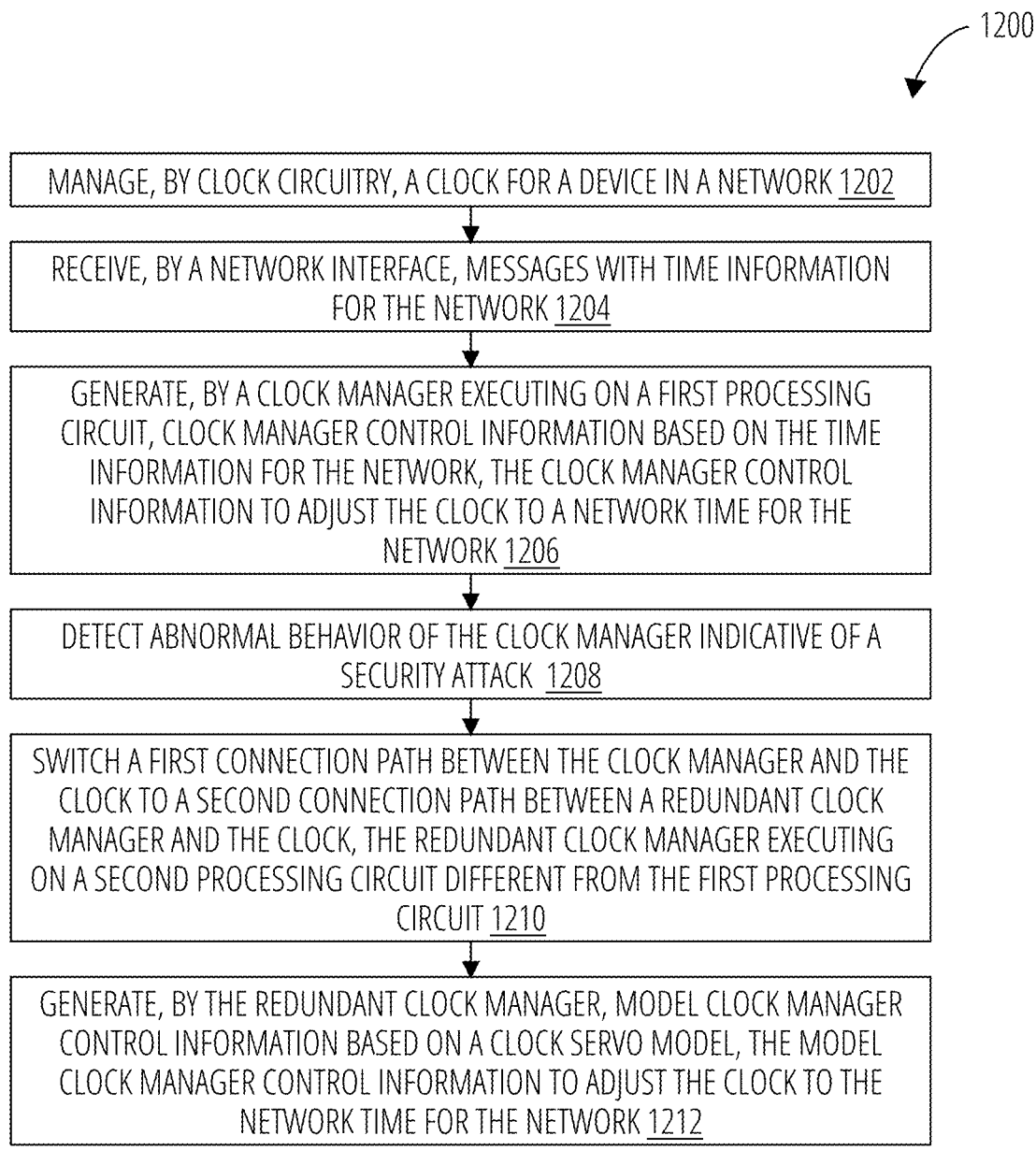
FIG. 12 illustrates an aspect of a logic flow 1200 in accordance with one embodiment.

FIG. 12 illustrates a logic flow 1200. The logic flow 1200 can be implemented by a TSN node 104. For instance, the logic flow 1200 can be implemented by an apparatus 400, 500, 600, 700, 800, 900 or system 1100 for a TSN node 104.

In block 1202, logic flow 1200 manages, by clock circuitry, a clock for a device in a network. For instance, the clock circuitry 412 manages or implements a clock 108 for a TSN node 104 in a time sensitive network 102.

In block 1204, logic flow 1200 receives, by a network interface, messages with time information for the network. For instance, a network interface 802 receives messages 112 with time information 418 for the time sensitive network 102.

In block 1206, logic flow 1200 generates, by a clock manager executing on a first processing circuit, clock manager control information based on the time information for the network, the clock manager control information to adjust the clock to a network time for the network. For instance, the clock manager 106 executes on a first processing circuit 1106 to generate clock manager control information 420 based on the time information 418 for the time sensitive network 102. The clock circuitry 412 receives the clock manager control information 420 and adjusts the clock 108 to a network time for the time sensitive network 102.

In block 1208, logic flow 1200 detects abnormal behavior of the clock manager indicative of a security attack. For instance, the detector 110 detects abnormal behavior of the clock manager 106 indicative of a security attack.

In block 1210, logic flow 1200 switches a first connection path between the clock manager and the clock to a second connection path between a redundant clock manager and the clock, the redundant clock manager executing on a second processing circuit different from the first processing circuit. For instance, the detector 110 can generate a control signal to switch a first connection path between the clock manager 106 and the clock 108 to a second connection path between a redundant clock manager 152 and the clock 108, the redundant clock manager 152 executing on a second processing circuit 1104 different from the first processing circuit 1106.

In block 1212, logic flow 1200 generates, by the redundant clock manager, model clock manager control information based on a clock servo model, the model clock manager control information to adjust the clock to the network time for the network. For instance, the redundant clock manager 152 generates model clock manager control information 912 based on a clock servo model 908, the model clock manager control information 912 to adjust the clock 108 to the network time for the time sensitive network 102. The clock servo model 908 generates model control information 906 based on a clock manager model 904, the clock manager model 904 to comprise a physics-based analytical model to represent physical relationships between components of a system, and output the model clock manager control information 912 based on the model control information 906. Other technical features may be readily apparent to one skilled in the art from the following figures, descriptions, and claims.

Figure 13:
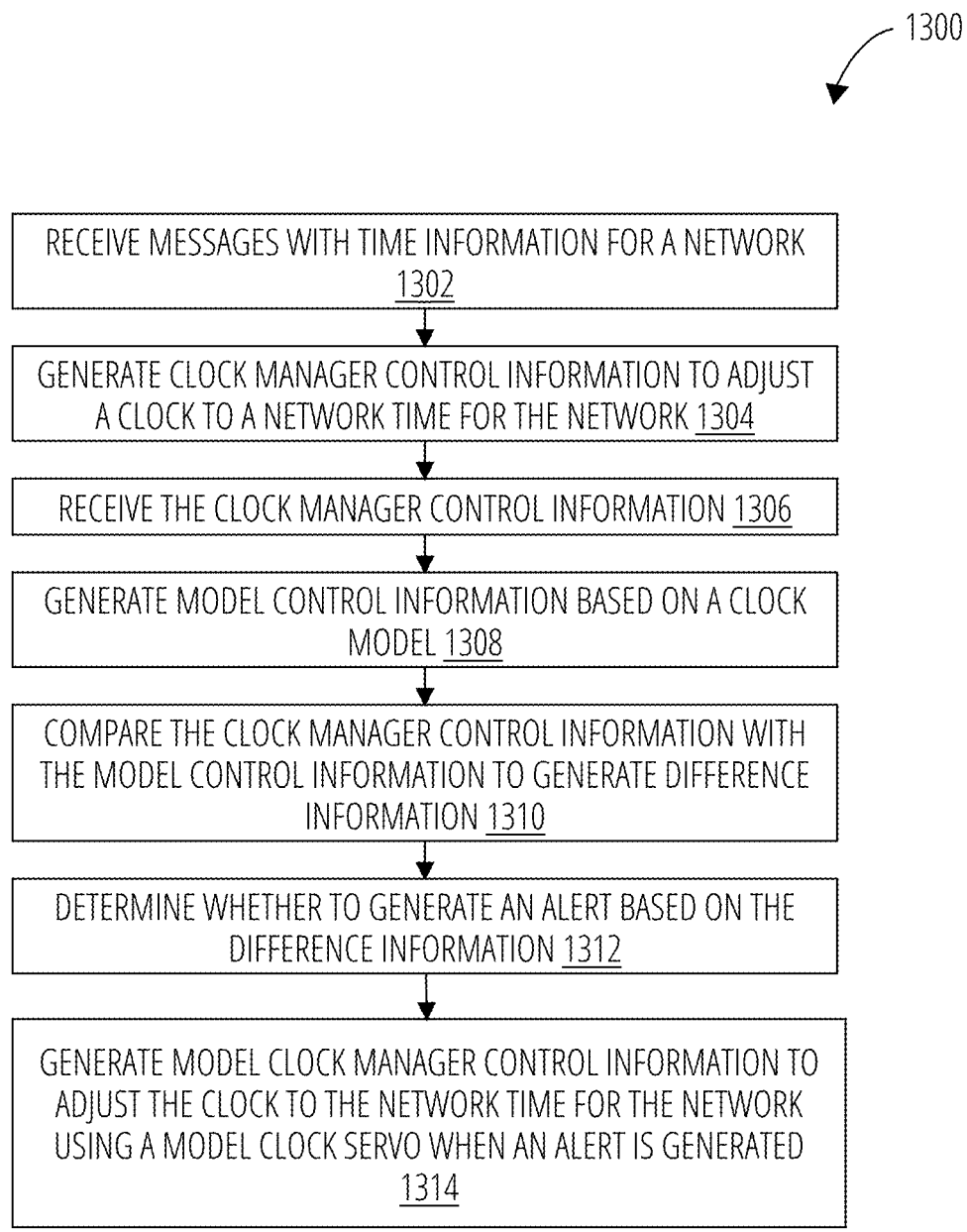
FIG. 13 illustrates an aspect of a logic flow 1300 in accordance with one embodiment.

FIG. 13 illustrates a logic flow 1300. The logic flow 1300 can be implemented by a TSN node 104. For instance, the logic flow 1300 can be implemented by an apparatus 400, 500, 600, 700, 800, 900 or system 1100 for a TSN node 104.

In block 1302, logic flow 1300 receives messages with time information for a network. For instance, a TSN 104 can implement an apparatus 600. A transceiver 410 of the apparatus 600 receives messages 112 with time information 418 for a time sensitive network 102. The transceiver 410 sends the time information 418 to a clock manager 106.

In block 1304, logic flow 1300 generates clock manager control information to adjust a clock to a network time for the network. For instance, the clock manager 106 generates clock manager control information 420 to adjust a clock 108 implemented by clock circuitry 412 to a network time for the time sensitive network 102.

In block 1306, logic flow 1300 receives the clock manager control information. For instance, a detector 110 of the apparatus 600 receives or intercepts the clock manager control information 420 from the clock manager 106.

In block 1308, logic flow 1300 generates model control information based on a clock manager model. For instance, a clock manager estimator 702 of the detector 110 receives the time information 418 as input. The clock estimator 702 generates model control information 706 based on a clock manager model 704. The clock manager model 704 is an analytical, physics-aware, implementation of the clock manager 106 that is separate from, and completely independent of, the clock manager 106. The clock manager model 704 captures dynamical clock manager behavior that holds state. It is a lightweight software implementation that executes in parallel with the clock manager 106. The clock manager model 704 is an analytical model that implements algebraic equations to increase compute and memory efficiency of an apparatus, device or system.

In block 1310, logic flow 1300 compares the clock manager control information with the model control information to generate difference information. For instance, a comparator 708 of the detector 110 receives as input the model control information 706 from the clock manager estimator 702 and clock manager control information 420 from the clock manager 106. The comparator 708 compares the clock manager control information 420 and the model control information 706, and generates difference information 710. The difference information 710 is a differential or residual between the clock manager control information 420 and the model control information 706, typically expressed in parts per billion (ppb).

In block 1312, logic flow 1300 determines whether to generate an alert based on the difference information. For instance, an alert generator 712 of the detector 110 receives the difference information 710 from the comparator 708. The alert generator 712 compares the difference information 710 to one or more threshold values. The alert generator 712 determines whether to generate an alert based on results of the comparison of the difference information 710 with the one or more threshold values. For instance, a threshold value might be expressed as m ppb, where m is any positive integer, such as 1 ppb, 5 ppb, 10 ppb, and so forth. When the difference information 710 is greater than, equal to, or lower than a threshold value (depending on implementation), the alert generator 712 sends an alert to an intrusion detection system 714. The intrusion detection system 714 receives the alert and implements one or more security protocols in response to the alert, such as isolating the TSN node 104, sending notifications to neighboring TSN nodes 104, reconfiguring a network topology for a time sensitive network 102 implementing the TSN node 104, informing a human operator, and so forth.

In block 1314, logic flow 1300 generates clock manager control information to adjust the clock to the network time for the network using a model clock servo when an alert is generated. For instance, the redundant clock manager 152 generates model clock manager control information 912 to adjust the clock 108 to the network time for the time sensitive network 102 using a model clock servo model 908 when an alert is generated.

Figure 14:
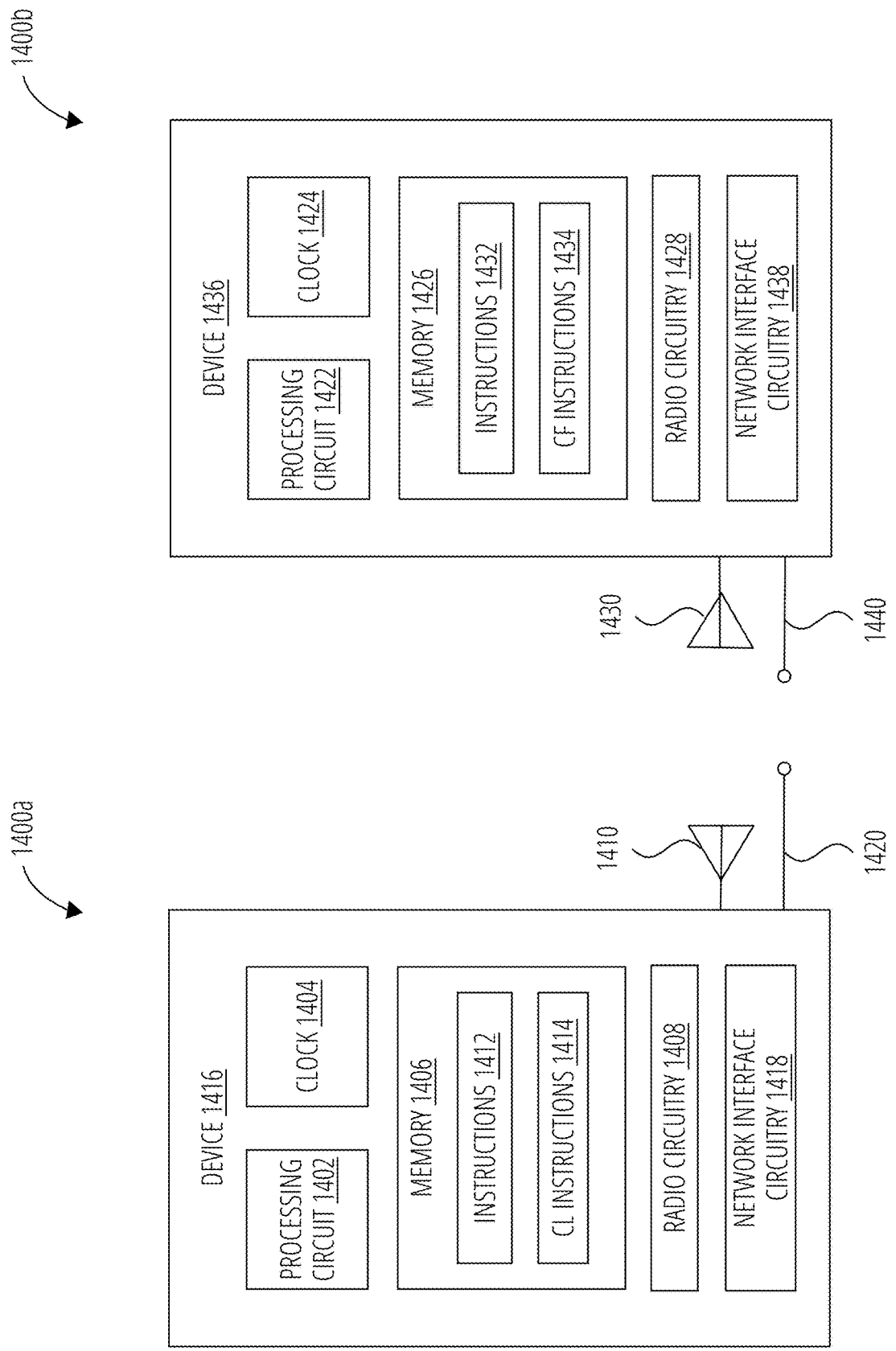
FIG. 14A illustrates an aspect of a clock leader (CL) 1400a in accordance with one embodiment.
FIG. 14B illustrates an aspect of a clock follower (CF) 1400b in accordance with one embodiment.

FIG. 14A depicts a device 1416. The device 1416 could be a network node or one of the switches in a TSN network (e.g., TSN nodes 104, talker node 202, relay nodes 204*a-c*, listener node 206, relay node 302, etc.). Device 1416 includes a processing circuit 1402, a clock 1404, memory 1406, radio circuitry 1408, an antenna 1410, a network interface circuitry 1418, and a wired connection 1420. Memory 1406 stores instructions 1412 and CL instructions 1414. During operation, processing circuit 1402 can execute instructions 1412 and/or CL instructions 1414 to cause device 1416 to send timing messages as a clock leader or grand clock leader (e.g., from time measurements from a global clock for a TSN network) to other devices in the TSN network. In some examples, processing circuit 1402 can execute instructions 1412 and/or CL instructions 1414 to cause device 1416 to send time synchronization messages, time update messages, and other timing messages defined by various IEEE standards as discussed herein. Furthermore, processing circuit 1402 can execute instructions 1412 to cause device 1416 to send, via radio circuitry 1408 and antenna 1410 or network interface circuitry 1418 timing messages as the CL for a CF in a TSN network.

FIG. 14B depicts a device 1436. The device 1436 could be one of the network nodes or switches in a TSN network (e.g., TSN nodes 104, talker node 202, relay nodes 204*a-c*, listener node 206, relay node 302, etc.). Device 1436 includes a processing circuit 1422, a clock 1424, memory 1426, radio circuitry 1428, an antenna 1430, a network interface circuitry 1438, and a wired connection 1440. Memory 1426 stores instructions 1432 and CF instructions 1434. During operation, processing circuit 1422 can execute instructions 1432 and/or CF instructions 1434 to cause device 1436 to receive timing messages as a clock follower (e.g., from time measurements from a global clock for a TSN network) from other devices in the TSN network, such as the device 1416. In some examples, processing circuit 1422 can execute instructions 1432 and/or CF instructions 1434 to cause device 1436 to receive time synchronization messages, time update messages, and other timing messages defined by various IEEE standards as discussed herein. Furthermore, processing circuit 1422 can execute instructions 1432 and/or CF instructions 1434 to cause device 1436 to receive, via radio circuitry 1428 and antenna 1430 or network interface circuitry 1438 timing messages as the CF for a CL in a TSN network. In addition, processing circuit 1422 can execute instructions 1432 and/or CF instructions 1434 to cause device 1436 to send, via radio circuitry 1428 and antenna 1430 or network interface circuitry 1438 security messages in response to a security attack, such as alert messages, notification messages, network reconfiguration messages, device isolation messages, model update messages, and other messages in a TSN network.

Figure 15:
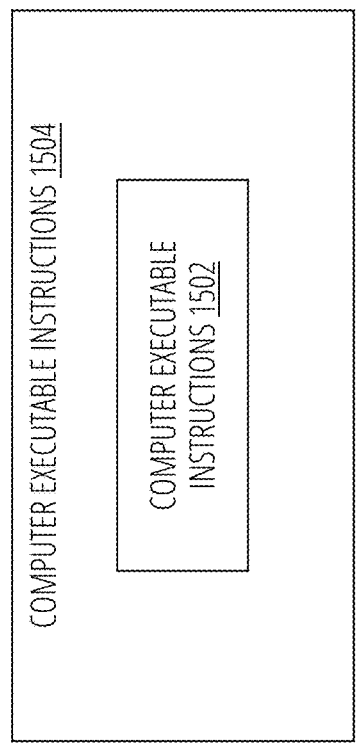
FIG. 15 illustrates an aspect of a computer-readable medium 1500 in accordance with one embodiment.

FIG. 15 illustrates computer-readable storage computer-readable medium 1500. Computer-readable storage computer-readable medium 1500 may comprise any non-transitory computer-readable storage medium or machine-readable storage medium, such as an optical, magnetic or semiconductor storage medium. In various embodiments, computer-readable storage computer-readable medium 1500 may comprise an article of manufacture. In some embodiments, computer-readable storage computer-readable medium 1500 may store computer executable instructions 1402 with which circuitry (e.g., processing circuitry 414, processing circuit 1402, processing circuit 1422, radio circuitry 1408, radio circuitry 1428, network interface circuitry 1418, network interface circuitry 1438, clock manager 106, clock circuitry 412, or the like) can execute. For example, computer executable instructions 1502 can include instructions to implement operations described with respect to logic flows 1900 and 2000. Examples of computer-readable storage computer-readable medium 1500 or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions 1502 may include any suitable type of code, such as source code, compiled code, interpreted code, executable code, static code, dynamic code, object-oriented code, visual code, and the like.

The following aspects and examples pertain to further embodiments, from which numerous permutations and configurations will be apparent.

In one independent example, an apparatus, includes a clock circuitry to manage a clock for a device. The apparatus also includes a first processing circuitry coupled to the clock circuitry, the first processing circuitry to execute instructions to perform operations for a clock manager, the clock manager to receive messages with time information for a network and generate clock manager control information to adjust the clock to a network time for the network. The apparatus also includes a hardened execution environment coupled to the clock circuitry and the first processing circuitry, the hardened execution environment to comprise a detector to monitor the clock manager and generate an alert when the detector identifies abnormal behavior of the clock manager, and a second processing circuitry to execute instructions to perform operations for a redundant clock manager, the redundant clock manager to take over operations for the clock manager in response to the alert from the detector.

The independent example may further include any one of the following dependent examples or any combination of the following dependent examples. For example, further to the independent example, the apparatus may also have a configuration or further where the hardened execution environment includes a secure trusted platform module (TPM) or trusted computing base (TCB) hardware platform.

The apparatus may also have a configuration or further the hardened execution environment to comprise a clock interface for the clock circuitry.

The apparatus may also have a configuration or further the hardened execution environment to comprise a clock manager application program interface (API) for an application execution environment.

The apparatus may also have a configuration or further the hardened execution environment to comprise an actuation router to switch from a first connection between the first processing circuitry to execute instructions for the clock manager and the clock circuitry to a second connection between the second processing circuitry to execute instructions for the redundant clock manager and the clock circuitry.

The apparatus may also have a configuration or further the hardened execution environment to comprise an application program interface (API) router to switch from a first connection between the first processing circuitry to execute instructions for the clock manager and an application execution environment to a second connection between the second processing circuitry to execute instructions for the redundant clock manager and the application execution environment.

The apparatus may also have a configuration or further the redundant clock manager to comprise a clock servo model, the clock servo model to comprise a clock manager estimator and a clock manager model, the clock manager estimator to receive as input message with time information for a network, generate model control information based on the clock manager model, and output model clock manager control information based on the model control information to the clock circuitry.

The apparatus may also have a configuration or further the redundant clock manager to generate model control information based on a clock manager model, the clock manager model to comprise a physics-based analytical model to represent physical relationships between components of a system.

The apparatus may also have a configuration or further the redundant clock manager to generate model control information based on a clock manager model, where the clock manager model is an equation-based representation of a proportional-integral (PI) controller.

The apparatus may also have a configuration or further where the detector is to receive the clock manager control information, generate model control information based on a clock manager model, compare the clock manager control information with the model control information to generate difference information, and determine whether to generate the alert based on the difference information.

The apparatus may also have a configuration or further where the detector outputs state information to a clock servo model for the redundant clock manager.

The apparatus may also have a configuration or further where the detector is a hardware detector.

The apparatus may also have a configuration or further where the detector is a software detector.

The apparatus may also have a configuration or further where the detector includes instructions executed by the second processing circuitry.

The apparatus may also have a configuration or further includes a residual integrator coupled to the detector, the residual integrator to integrate and analyze the difference information over a defined time period.

The apparatus may also have a configuration or further where the network is a time sensitive network.

The apparatus may also have a configuration or further where the device operates in accordance with an Institute of Electrical and Electronics Engineers (IEEE) 802.1AS and/or 802.1Qbv and/or 802.15.4 standards.

The apparatus may also have a configuration or further where the network time is a precision time protocol (PTP) time.

The apparatus may also have a configuration or further where the messages are synchronization messages or follow up messages for a precision time protocol (PTP).

The apparatus may also have a configuration or further where the clock managed by the clock circuitry is a precision time protocol (PTP) hardware clock (PHC).

The apparatus may also have a configuration or further where the device operates in a clock follower (CF) role.

The apparatus may also have a configuration or further where the clock manager is a precision time protocol (PTP) for Linux (PTP4L) software component configured to account for a time offset between a clock of a clock leader (CL) in a PTP-synchronized network and the clock for the device when operating as a clock follower (CF) in the PTP-synchronized network.

The apparatus may also have a configuration or further where the clock manager control information to comprise a time offset between a reference time and a time maintained by the clock, the reference time based on the time information in at least one message.

The apparatus may also have a configuration or further where the clock manager control information to comprise one or more parameters to adjust the clock circuitry for the device, the one or more parameters to represent adjustments to a phase or frequency of the clock circuitry.

The apparatus may also have a configuration or further the detector to generate model control information based on a clock manager model, the clock manager model to comprise a physics-based analytical model to represent physical relationships between components of a system.

The apparatus may also have a configuration or further the detector to generate model control information based on a clock manager model, where the clock manager model is an equation-based representation of a proportional-integral (PI) controller.

The apparatus may also have a configuration or further the detector to determine whether to generate an alert based on the difference information, the detector to compare the difference information measured periodically to a defined threshold representing a value in parts per billion (ppb).

The apparatus may also have a configuration or further the detector to determine whether to generate an alert based on the difference information, the detector to compare the difference information measured every synchronization cycle to a defined threshold represented in units of parts per billion (ppb), the defined threshold to be equal to or greater than 1 ppb.

The apparatus may also have a configuration or further where the network is a controller area network (CAN) or a vehicle area network (VAN).

The apparatus may also have a configuration or further where the device manages a sensor, actuator or a controller.

The apparatus may also have a configuration or further where the sensors comprise a speed sensor, a direction sensor, a global positioning system (GPS) sensor, a gas pedal sensor, a brake pedal sensor, a positioning sensor, an object detection sensor, a lane detection sensor, a radar sensor, a light detection and ranging (LIDAR) sensor, an ultrasound sensor, an inertial measurement unit (IMU) sensor, a temperature sensor, a pressure sensor, an altitude sensor, and an acoustic sensor.

The apparatus may also have a configuration or further includes an intrusion detection system (IDS) coupled to the detector, the IDS system to receive the alert and take corrective action for the device or the network.

The apparatus may also have a configuration or further includes a memory coupled to the first processing circuitry, the memory to store instructions that when executed by the first processing circuitry performs operations for the clock manager.

The apparatus may also have a configuration or further includes a memory coupled to the second processing circuitry, the memory to store instructions that when executed by the second processing circuitry performs operations for the detector.

The apparatus may also have a configuration or further where the detector includes circuitry for a hardware platform.

The apparatus may also have a configuration or further where a single integrated device includes the first processing circuitry, the hardened execution environment, a memory, a transceiver, and the clock circuitry.

The apparatus may also have a configuration or further includes a transceiver coupled to the first processing circuitry and the second processing circuitry, the transceiver to communicate the messages with the time information for the device. Other technical features may be readily apparent to one skilled in the art from the following figures, descriptions, and claims.

In one independent example, a computing-implemented method, includes managing, by clock circuitry, a clock for a device in a network, receiving, by a network interface, messages with time information for the network, generating, by a clock manager executing on a first processing circuit, clock manager control information based on the time information for the network, the clock manager control information to adjust the clock to a network time for the network, detecting abnormal behavior of the clock manager indicative of a security attack, switching a first connection path between the clock manager and the clock to a second connection path between a redundant clock manager and the clock, the redundant clock manager executing on a second processing circuit different from the first processing circuit, and generating, by the redundant clock manager, model clock manager control information based on a clock servo model, the model clock manager control information to adjust the clock to the network time for the network.

The independent example may further include any one of the following dependent examples or any combination of the following dependent examples. For example, further to the independent example, the computing-implemented method may also have a configuration or further where the clock servo model generates model control information based on a clock manager model, the clock manager model to comprise a physics-based analytical model to represent physical relationships between components of a system, and output the model clock manager control information based on the model control information.

The computing-implemented method may also have a configuration or further where the second processing circuit is part of a hardened execution environment that includes a secure trusted platform module (TPM) or trusted computing base (TCB) hardware platform.

The computing-implemented method may also have a configuration or further where the second processing circuit is part of a hardened execution environment that includes a clock interface for the clock circuitry.

The computing-implemented method may also have a configuration or further where the second processing circuit is part of a hardened execution environment that includes a clock manager application program interface (API) for an application execution environment.

The computing-implemented method may also have a configuration or further includes switching from a first connection between the first processing circuitry to execute instructions for the clock manager and the clock circuitry to a second connection between the second processing circuitry to execute instructions for the redundant clock manager and the clock circuitry.

The computing-implemented method may also have a configuration or further includes switching from a first connection between the first processing circuitry to execute instructions for the clock manager and an application execution environment to a second connection between the second processing circuitry to execute instructions for the redundant clock manager and the application execution environment.

The computing-implemented method may also have a configuration or further includes receiving as input message with time information for a network, generating model control information based on the clock manager model, and outputting model clock manager control information based on the model control information to the clock circuitry.

The computing-implemented method may also have a configuration or further includes generating model control information based on a clock manager model, the clock manager model to comprise a physics-based analytical model to represent physical relationships between components of a system.

The computing-implemented method may also have a configuration or further includes generating model control information based on a clock manager model, where the clock manager model is an equation-based representation of a proportional-integral (PI) controller.

The computing-implemented method may also have a configuration or further includes receiving the clock manager control information, generating model control information based on a clock manager model, comparing the clock manager control information with the model control information to generate difference information, and determining whether to generate the alert based on the difference information.

The computing-implemented method may also have a configuration or further includes outputting state information to a clock servo model for the redundant clock manager.

The computing-implemented method may also have a configuration or further includes analyzing the difference information over a defined time period.

The computing-implemented method may also have a configuration or further where the network is a time sensitive network.

The computing-implemented method may also have a configuration or further where the device operates in accordance with an Institute of Electrical and Electronics Engineers (IEEE) 802.1AS and/or 802.1Qbv and/or 802.15.4 standards.

The computing-implemented method may also have a configuration or further where the network time is a precision time protocol (PTP) time.

The computing-implemented method may also have a configuration or further where the messages are synchronization messages or follow up messages for a precision time protocol (PTP).

The computing-implemented method may also have a configuration or further where the clock managed by the clock circuitry is a precision time protocol (PTP) hardware clock (PHC).

The computing-implemented method may also have a configuration or further where the device operates in a clock follower (CF) role.

The computing-implemented method may also have a configuration or further where the clock manager is a precision time protocol (PTP) for Linux (PTP4L) software component configured to account for a time offset between a clock of a clock leader (CL) in a PTP-synchronized network and the clock for the device when operating as a clock follower (CF) in the PTP-synchronized network.

The computing-implemented method may also have a configuration or further where the clock manager control information to comprise a time offset between a reference time and a time maintained by the clock, the reference time based on the time information in at least one message.

The computing-implemented method may also have a configuration or further where the clock manager control information to comprise one or more parameters to adjust the clock circuitry for the device, the one or more parameters to represent adjustments to a phase or frequency of the clock circuitry.

The computing-implemented method may also have a configuration or further includes generating model control information based on a clock manager model, the clock manager model to comprise a physics-based analytical model to represent physical relationships between components of a system.

The computing-implemented method may also have a configuration or further includes generating model control information based on a clock manager model, where the clock manager model is an equation-based representation of a proportional-integral (PI) controller.

The computing-implemented method may also have a configuration or further includes comparing the difference information measured periodically to a defined threshold representing a value in parts per billion (ppb), and determining whether to generate an alert based on results of the comparison.

The computing-implemented method may also have a configuration or further includes comparing the difference information measured every synchronization cycle to a defined threshold represented in units of parts per billion (ppb), the defined threshold to be equal to or greater than 1 ppb, and determining whether to generate an alert based on results of the comparison.

The computing-implemented method may also have a configuration or further where the network is a controller area network (CAN) or a vehicle area network (VAN).

The computing-implemented method may also have a configuration or further where the device manages a sensor, actuator or a controller.

The computing-implemented method may also have a configuration or further where the sensors comprise a speed sensor, a direction sensor, a global positioning system (GPS) sensor, a gas pedal sensor, a brake pedal sensor, a positioning sensor, an object detection sensor, a lane detection sensor, a radar sensor, a light detection and ranging (LIDAR) sensor, an ultrasound sensor, an inertial measurement unit (IMU) sensor, a temperature sensor, a pressure sensor, an altitude sensor, and an acoustic sensor.

The computing-implemented method may also have a configuration or further includes receiving the alert and take corrective action for the device or the network.

The computing-implemented method may also have a configuration or further includes communicating the messages with the time information for the device.

The computing-implemented method may also have a configuration or further includes generating model control information based on a clock manager model, the clock manager model to comprise a physics-based analytical model to represent physical relationships between components of a system, and outputting the model clock manager control information based on the model control information.

Other technical features may be readily apparent to one skilled in the art from the following figures, descriptions, and claims.

In one independent example, a non-transitory computer-readable storage medium, the computer-readable storage medium including instructions that when executed by a computer, cause the computer to manage, by clock circuitry, a clock for a device in a network, receive, by a network interface, messages with time information for the network, generate, by a clock manager executing on a first processing circuit, clock manager control information based on the time information for the network, the clock manager control information to adjust the clock to a network time for the network, detect abnormal behavior of the clock manager indicative of a security attack, switch a first connection path between the clock manager and the clock to a second connection path between a redundant clock manager and the clock, the redundant clock manager executing on a second processing circuit different from the first processing circuit, and generate, by the redundant clock manager, model clock manager control information based on a clock servo model, the model clock manager control information to adjust the clock to the network time for the network.

The independent example may further include any one of the following dependent examples or any combination of the following dependent examples. For example, further to the independent example, the computer-readable storage medium may also have a configuration or further where the clock servo model generates model control information based on a clock manager model, the clock manager model to comprise a physics-based analytical model to represent physical relationships between components of a system, and output the model clock manager control information based on the model control information.

The computer-readable storage medium may also have a configuration or further where the second processing circuit is part of a hardened execution environment that includes a secure trusted platform module (TPM) or trusted computing base (TCB) hardware platform.

The computer-readable storage medium may also have a configuration or further where the second processing circuit is part of a hardened execution environment that includes a clock interface for the clock circuitry.

The computer-readable storage medium may also have a configuration or further where the second processing circuit is part of a hardened execution environment that includes a clock manager application program interface (API) for an application execution environment.

The computer-readable storage medium may also have a configuration or further includes instructions that when executed by a computer, cause the computer to switch from a first connection between the first processing circuitry to execute instructions for the clock manager and the clock circuitry to a second connection between the second processing circuitry to execute instructions for the redundant clock manager and the clock circuitry.

The computer-readable storage medium may also have a configuration or further includes instructions that when executed by a computer, cause the computer to switch from a first connection between the first processing circuitry to execute instructions for the clock manager and an application execution environment to a second connection between the second processing circuitry to execute instructions for the redundant clock manager and the application execution environment.

The computer-readable storage medium may also have a configuration or further includes instructions that when executed by a computer, cause the computer to receive as input message with time information for a network, generate model control information based on the clock manager model, and output model clock manager control information based on the model control information to the clock circuitry.

The computer-readable storage medium may also have a configuration or further includes instructions that when executed by a computer, cause the computer to generate model control information based on a clock manager model, the clock manager model to comprise a physics-based analytical model to represent physical relationships between components of a system.

The computer-readable storage medium may also have a configuration or further includes instructions that when executed by a computer, cause the computer to generate model control information based on a clock manager model, where the clock manager model is an equation-based representation of a proportional-integral (PI) controller.

The computer-readable storage medium may also have a configuration or further includes instructions that when executed by a computer, cause the computer to receive the clock manager control information, generate model control information based on a clock manager model, compare the clock manager control information with the model control information to generate difference information, and determine whether to generate the alert based on the difference information.

The computer-readable storage medium may also have a configuration or further includes instructions that when executed by a computer, cause the computer to output state information to a clock servo model for the redundant clock manager.

The computer-readable storage medium may also have a configuration or further includes instructions that when executed by a computer, cause the computer to analyze the difference information over a defined time period.

The computer-readable storage medium may also have a configuration or further where the network is a time sensitive network.

The computer-readable storage medium may also have a configuration or further where the device operates in accordance with an Institute of Electrical and Electronics Engineers (IEEE) 802.1AS and/or 802.1Qbv and/or 802.15.4 standards.

The computer-readable storage medium may also have a configuration or further where the network time is a precision time protocol (PTP) time.

The computer-readable storage medium may also have a configuration or further where the messages are synchronization messages or follow up messages for a precision time protocol (PTP).

The computer-readable storage medium may also have a configuration or further where the clock managed by the clock circuitry is a precision time protocol (PTP) hardware clock (PHC).

The computer-readable storage medium may also have a configuration or further where the device operates in a clock follower (CF) role.

The computer-readable storage medium may also have a configuration or further where the clock manager is a precision time protocol (PTP) for Linux (PTP4L) software component configured to account for a time offset between a clock of a clock leader (CL) in a PTP-synchronized network and the clock for the device when operate as a clock follower (CF) in the PTP-synchronized network.

The computer-readable storage medium may also have a configuration or further where the clock manager control information to comprise a time offset between a reference time and a time maintained by the clock, the reference time based on the time information in at least one message.

The computer-readable storage medium may also have a configuration or further where the clock manager control information to comprise one or more parameters to adjust the clock circuitry for the device, the one or more parameters to represent adjustments to a phase or frequency of the clock circuitry.

The computer-readable storage medium may also have a configuration or further includes instructions that when executed by a computer, cause the computer to generate model control information based on a clock manager model, the clock manager model to comprise a physics-based analytical model to represent physical relationships between components of a system.

The computer-readable storage medium may also have a configuration or further includes instructions that when executed by a computer, cause the computer to generate model control information based on a clock manager model, where the clock manager model is an equation-based representation of a proportional-integral (PI) controller.

The computer-readable storage medium may also have a configuration or further includes instructions that when executed by a computer, cause the computer to compare the difference information measured periodically to a defined threshold representing a value in parts per billion (ppb), and determine whether to generate an alert based on results of the comparison.

The computer-readable storage medium may also have a configuration or further includes instructions that when executed by a computer, cause the computer to compare the difference information measured every synchronization cycle to a defined threshold represented in units of parts per billion (ppb), the defined threshold to be equal to or greater than 1 ppb, and determine whether to generate an alert based on results of the comparison.

The computer-readable storage medium may also have a configuration or further where the network is a controller area network (CAN) or a vehicle area network (VAN).

The computer-readable storage medium may also have a configuration or further where the device manages a sensor, actuator or a controller.

The computer-readable storage medium may also have a configuration or further where the sensors comprise a speed sensor, a direction sensor, a global positioning system (GPS) sensor, a gas pedal sensor, a brake pedal sensor, a positioning sensor, an object detection sensor, a lane detection sensor, a radar sensor, a light detection and ranging (LIDAR) sensor, an ultrasound sensor, an inertial measurement unit (IMU) sensor, a temperature sensor, a pressure sensor, an altitude sensor, and an acoustic sensor.

The computer-readable storage medium may also have a configuration or further includes instructions that when executed by a computer, cause the computer to receive the alert and take corrective action for the device or the network.

The computer-readable storage medium may also have a configuration or further includes instructions that when executed by a computer, cause the computer to communicate the messages with the time information for the device.

The computer-readable storage medium may also have a configuration or further includes instructions that when executed by a computer, cause the computer to generate model control information based on a clock manager model, the clock manager model to comprise a physics-based analytical model to represent physical relationships between components of a system, and output the model clock manager control information based on the model control information. Other technical features may be readily apparent to one skilled in the art from the following figures, descriptions, and claims.

In one independent example, an apparatus, includes means for managing, by clock circuitry, a clock for a device in a network, means for receiving, by a network interface, messages with time information for the network, means for generating, by a clock manager executing on a first processing circuit, clock manager control information based on the time information for the network, the clock manager control information to adjust the clock to a network time for the network, means for detecting abnormal behavior of the clock manager indicative of a security attack, means for switching a first connection path between the clock manager and the clock to a second connection path between a redundant clock manager and the clock, the redundant clock manager executing on a second processing circuit different from the first processing circuit, and means for generating, by the redundant clock manager, model clock manager control information based on a clock servo model, the model clock manager control information to adjust the clock to the network time for the network.

The independent example may further include any one of the following dependent examples or any combination of the following dependent examples. For example, further to the independent example, the apparatus may also have a configuration or further where the clock servo model generates model control information based on a clock manager model, the clock manager model to comprise a physics-based analytical model to represent physical relationships between components of a system, and output the model clock manager control information based on the model control information.

The apparatus may also have a configuration or further where the second processing circuit is part of a hardened execution environment that includes a secure trusted platform module (TPM) or trusted computing base (TCB) hardware platform.

The apparatus may also have a configuration or further where the second processing circuit is part of a hardened execution environment that includes a clock interface for the clock circuitry.

The apparatus may also have a configuration or further where the second processing circuit is part of a hardened execution environment that includes a clock manager application program interface (API) for an application execution environment.

The apparatus may also have a configuration or further includes means for switching from a first connection between the first processing circuitry to execute instructions for the clock manager and the clock circuitry to a second connection between the second processing circuitry to execute instructions for the redundant clock manager and the clock circuitry.

The apparatus may also have a configuration or further includes means for switching from a first connection between the first processing circuitry to execute instructions for the clock manager and an application execution environment to a second connection between the second processing circuitry to execute instructions for the redundant clock manager and the application execution environment.

The apparatus may also have a configuration or further includes means for receiving as input message with time information for a network, means for generating model control information based on the clock manager model, and means for outputting model clock manager control information based on the model control information to the clock circuitry.

The apparatus may also have a configuration or further includes means for generating model control information based on a clock manager model, the clock manager model to comprise a physics-based analytical model to represent physical relationships between components of a system.

The apparatus may also have a configuration or further includes means for generating model control information based on a clock manager model, where the clock manager model is an equation-based representation of a proportional-integral (PI) controller.

The apparatus may also have a configuration or further includes means for receiving the clock manager control information, means for generating model control information based on a clock manager model, means for comparing the clock manager control information with the model control information to generate difference information, and means for determining whether to generate the alert based on the difference information.

The apparatus may also have a configuration or further includes means for outputting state information to a clock servo model for the redundant clock manager.

The apparatus may also have a configuration or further includes means for analyzing the difference information over a defined time period.

The apparatus may also have a configuration or further where the network is a time sensitive network.

The apparatus may also have a configuration or further where the device operates in accordance with an Institute of Electrical and Electronics Engineers (IEEE) 802.1AS and/or 802.1Qbv and/or 802.15.4 standards.

The apparatus may also have a configuration or further where the network time is a precision time protocol (PTP) time.

The apparatus may also have a configuration or further where the messages are synchronization messages or follow up messages for a precision time protocol (PTP).

The apparatus may also have a configuration or further where the clock managed by the clock circuitry is a precision time protocol (PTP) hardware clock (PHC).

The apparatus may also have a configuration or further where the device operates in a clock follower (CF) role.

The apparatus may also have a configuration or further where the clock manager is a precision time protocol (PTP) for Linux (PTP4L) software component configured to account for a time offset between a clock of a clock leader (CL) in a PTP-synchronized network and the clock for the device when operating as a clock follower (CF) in the PTP-synchronized network.

The apparatus may also have a configuration or further where the clock manager control information to comprise a time offset between a reference time and a time maintained by the clock, the reference time based on the time information in at least one message.

The apparatus may also have a configuration or further where the clock manager control information to comprise one or more parameters to adjust the clock circuitry for the device, the one or more parameters to represent adjustments to a phase or frequency of the clock circuitry.

The apparatus method may also have a configuration or further includes means for generating model control information based on a clock manager model, the clock manager model to comprise a physics-based analytical model to represent physical relationships between components of a system.

The apparatus method may also have a configuration or further includes means for generating model control information based on a clock manager model, where the clock manager model is an equation-based representation of a proportional-integral (PI) controller.

The apparatus may also have a configuration or further includes means for comparing the difference information measured periodically to a defined threshold representing a value in parts per billion (ppb), and means for determining whether to generate an alert based on results of the comparison.

The apparatus may also have a configuration or further includes means for comparing the difference information measured every synchronization cycle to a defined threshold represented in units of parts per billion (ppb), the defined threshold to be equal to or greater than 1 ppb, and means for determining whether to generate an alert based on results of the comparison.

The apparatus may also have a configuration or further where the network is a controller area network (CAN) or a vehicle area network (VAN).

The apparatus may also have a configuration or further where the device manages a sensor, actuator or a controller.

The apparatus may also have a configuration or further where the sensors comprise a speed sensor, a direction sensor, a global positioning system (GPS) sensor, a gas pedal sensor, a brake pedal sensor, a positioning sensor, an object detection sensor, a lane detection sensor, a radar sensor, a light detection and ranging (LIDAR) sensor, an ultrasound sensor, an inertial measurement unit (IMU) sensor, a temperature sensor, a pressure sensor, an altitude sensor, and an acoustic sensor.

The apparatus may also have a configuration or further includes means for receiving the alert and take corrective action for the device or the network.

The apparatus may also have a configuration or further includes means for communicating the messages with the time information for the device.

The apparatus may also have a configuration or further includes means for generating model control information based on a clock manager model, the clock manager model to comprise a physics-based analytical model to represent physical relationships between components of a system, and means for outputting the model clock manager control information based on the model control information. Other technical features may be readily apparent to one skilled in the art from the following figures, descriptions, and claims.

What is claimed is:
1. An apparatus, comprising:
a clock circuitry to manage a clock for a device;
a first processing circuitry coupled to the clock circuitry, the first processing circuitry to execute instructions to perform operations for a clock manager, the clock manager to receive messages with time information for a network and generate clock manager control information to adjust the clock to a network time for the network;
a hardened execution environment coupled to the clock circuitry and the first processing circuitry, the hardened execution environment to comprise:
a detector to monitor the clock manager and generate an alert when the detector identifies abnormal behavior of the clock manager based on predictions of the clock manager control information; and
a second processing circuitry to execute instructions to perform operations for a redundant clock manager, the redundant clock manager to generate model control information based on a clock manager model comprising an analytical model representing a behavior of the clock manager, the redundant clock manager to take over the operations for the clock manager in response to the alert from the detector; and
wherein the first processing circuitry and the second processing circuitry are co-located on the device.

2. The apparatus of claim 1, wherein the hardened execution environment comprises a secure trusted platform module (TPM) or trusted computing base (TCB) hardware platform.

3. The apparatus of claim 1, the hardened execution environment to comprise a clock interface for the clock circuitry.

4. The apparatus of claim 1, the hardened execution environment to comprise a clock manager application program interface (API) for an application execution environment.

5. The apparatus of claim 1, the hardened execution environment to comprise an actuation router to switch from a first connection between the first processing circuitry to execute the instructions for the clock manager and the clock circuitry to a second connection between the second processing circuitry to execute instructions for the redundant clock manager and the clock circuitry.

6. The apparatus of claim 1, the hardened execution environment to comprise an application program interface (API) router to switch from a first connection between the first processing circuitry to execute the instructions for the clock manager and an application execution environment to a second connection between the second processing circuitry to execute instructions for the redundant clock manager and the application execution environment.

7. The apparatus of claim 1, the redundant clock manager to comprise a clock servo model, the clock servo model to comprise a clock manager estimator and the clock manager model, the clock manager estimator to receive an input message with time information for a network, generate model control information based on the clock manager model, and output model clock manager control information based on the model control information to the clock circuitry.

8. The apparatus of claim 1, the clock manager model to comprise a physics-based analytical model to represent physical relationships between components of a system.

9. The apparatus of claim 1, the redundant clock manager to generate model control information based on a clock manager model, wherein the clock manager model is an equation-based representation of a proportional-integral (PI) controller.

10. A computing-implemented method, comprising:
managing, by clock circuitry, a clock for a device in a network;
receiving, by a network interface, messages with time information for the network;
generating, by a clock manager executing on a first processing circuit, clock manager control information based on the time information for the network, the clock manager control information to adjust the clock to a network time for the network;
detecting abnormal behavior of the clock manager indicative of a security attack based on predictions of the clock manager control information;
switching a first connection path between the clock manager and the clock to a second connection path between a redundant clock manager and the clock, the redundant clock manager executing on a second processing circuit different from the first processing circuit, wherein the first processing circuitry and the second processing circuitry are co-located on the device; and
generating, by the redundant clock manager, model clock manager control information based on a clock manager model comprising an analytical model representing a behavior of the clock manager, the model clock manager control information to adjust the clock to the network time for the network.

11. The computing-implemented method of claim 10, wherein the clock manager model to comprise a physics-based analytical model to represent physical relationships between components of a system, and output the model clock manager control information based on the model control information.

12. The computing-implemented method of claim 10, wherein the second processing circuit is part of a hardened execution environment that comprises a secure trusted platform module (TPM) or trusted computing base (TCB) hardware platform.

13. The computing-implemented method of claim 10, wherein the second processing circuit is part of a hardened execution environment that comprises a clock interface for the clock circuitry.

14. The computing-implemented method of claim 10, wherein the second processing circuit is part of a hardened execution environment that comprises a clock manager application program interface (API) for an application execution environment.

15. The computing-implemented method of claim 10, comprising switching from a first connection between the first processing circuitry to execute instructions for the clock manager and the clock circuitry to a second connection between the second processing circuitry to execute instructions for the redundant clock manager and the clock circuitry.

16. The computing-implemented method of claim 10, comprising switching from a first connection between the first processing circuitry to execute instructions for the clock manager and an application execution environment to a second connection between the second processing circuitry to execute instructions for the redundant clock manager and the application execution environment.

17. A non-transitory computer-readable storage medium, the computer-readable storage medium including instructions that when executed by a computer, cause the computer to:
manage a clock for a device in a network;
receive messages with time information for the network;
generate, by a clock manager executing on a first processing circuit, clock manager control information based on the time information for the network, the clock manager control information to adjust the clock to a network time for the network;
detect abnormal behavior of the clock manager indicative of a security attack based on predictions of the clock manager control information;
switch a first connection path between the clock manager and the clock to a second connection path between a redundant clock manager and the clock, the redundant clock manager executing on a second processing circuit different from the first processing circuit, wherein the first processing circuitry and the second processing circuitry are co-located on the device; and
generate, by the redundant clock manager, model clock manager control information based on a clock manager model comprising an analytical model representing a behavior of the clock manager, the model clock manager control information to adjust the clock to the network time for the network.

18. The computer-readable storage medium of claim 17, wherein the clock manager model to comprise a physics-based analytical model to represent physical relationships between components of a system, and output the model clock manager control information based on the model control information.

19. The computer-readable storage medium of claim 17, comprising instructions that when executed by a computer, cause the computer to switch from a first connection between the first processing circuitry to execute instructions for the clock manager and the clock circuitry to a second connection between the second processing circuitry to execute instructions for the redundant clock manager and the clock circuitry.

20. The computer-readable storage medium of claim 17, comprising instructions that when executed by a computer, cause the computer to switch from a first connection between the first processing circuitry to execute instructions for the clock manager and an application execution environment to a second connection between the second processing circuitry to execute instructions for the redundant clock manager and the application execution environment.

* * * * *